(12) United States Patent
Nishitani et al.

(10) Patent No.: US 9,103,950 B2
(45) Date of Patent: Aug. 11, 2015

(54) SURFACE LIGHT SOURCE DEVICE AND LIQUID CRYSTAL DISPLAY DEVICE

(75) Inventors: Rena Nishitani, Tokyo (JP); Nami Nakano, Tokyo (JP); Shuichi Kagawa, Tokyo (JP); Muneharu Kuwata, Tokyo (JP); Kuniko Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/985,551

(22) PCT Filed: Feb. 9, 2012

(86) PCT No.: PCT/JP2012/000855
§ 371 (c)(1),
(2), (4) Date: Aug. 14, 2013

(87) PCT Pub. No.: WO2012/111283
PCT Pub. Date: Aug. 23, 2012

(65) Prior Publication Data
US 2013/0322111 A1    Dec. 5, 2013

(30) Foreign Application Priority Data
Feb. 15, 2011    (JP) .................................. 2011-029835

(51) Int. Cl.
*F21V 8/00*    (2006.01)

(52) U.S. Cl.
CPC ............ *G02B 6/0011* (2013.01); *G02B 6/0028* (2013.01); *G02B 6/0036* (2013.01); *G02B 6/0061* (2013.01); *G02B 6/0076* (2013.01)

(58) Field of Classification Search
CPC .. G02B 6/0011; G02B 6/0028; G02B 6/0036; G02B 6/0061; G02B 6/0076
USPC ................ 362/608, 609, 606, 612, 613, 621; 349/61, 64, 65
See application file for complete search history.

(56) References Cited

U.S. PATENT DOCUMENTS

| | | | | |
|---|---|---|---|---|
| 5,021,928 A | * | 6/1991 | Daniel | 362/556 |
| 5,515,198 A | * | 5/1996 | Kusuda et al. | 359/205.1 |
| 6,134,092 A | * | 10/2000 | Pelka et al. | 361/31 |
| 6,167,182 A | * | 12/2000 | Shinohara et al. | 385/129 |

(Continued)

FOREIGN PATENT DOCUMENTS

| | | |
|---|---|---|
| CN | 1658041 A | 8/2005 |
| CN | 101523110 A | 9/2009 |

(Continued)

*Primary Examiner* — Thomas A Hollweg
(74) *Attorney, Agent, or Firm* — Birch, Stewart, Kolasch & Birch, LLP

(57) ABSTRACT

An angular intensity distribution shaping member includes a first surface for receiving a light beam emitted from a light source, the first surface having a length in a width direction that is longer than that in a thickness direction; second surfaces forming a plate-shaped light path on which the light beam incident from the first surface propagates by total reflection, the second surfaces including at least one adjustment surface for spreading a full angle of an angular intensity distribution, in the width direction, of the light beam incident from the first surface so that the full angle becomes wider than that of the angular intensity distribution of the light beam just after emission from the light source; and a third surface through which the light beam exits, the full angle of its angular intensity distribution in the width direction having been widened by the at least one adjustment surface.

16 Claims, 15 Drawing Sheets

(56) References Cited

U.S. PATENT DOCUMENTS

| | | |
|---|---|---|
| 6,951,401 B2 | 10/2005 | Van Hees et al. |
| 7,101,063 B2 | 9/2006 | Long et al. |
| 7,347,610 B2 * | 3/2008 | Chang et al. ............... 362/621 |
| 7,357,557 B2 | 4/2008 | Miyashita |
| 7,703,970 B2 * | 4/2010 | Blach ............................ 362/609 |
| 7,859,610 B2 * | 12/2010 | Mizushima et al. ........... 349/61 |
| 7,918,600 B2 * | 4/2011 | Nagata et al. ................. 362/616 |
| 7,944,428 B2 * | 5/2011 | Travis ............................ 345/102 |
| 7,969,532 B2 * | 6/2011 | Mizushima et al. ........... 349/65 |
| 8,029,179 B2 * | 10/2011 | Itoh et al. ..................... 362/608 |
| 8,068,196 B2 * | 11/2011 | Shikii et al. .................... 349/65 |
| 8,154,685 B2 * | 4/2012 | Nakayama et al. ............ 349/64 |
| 8,206,020 B2 * | 6/2012 | Nagata et al. ................. 362/609 |
| 2003/0218874 A1 * | 11/2003 | Fujino et al. .................... 362/31 |
| 2004/0207775 A1 * | 10/2004 | Min et al. ....................... 349/65 |
| 2005/0174658 A1 | 8/2005 | Long et al. |
| 2005/0201120 A1 * | 9/2005 | Nesterenko et al. .......... 362/609 |
| 2006/0039166 A1 * | 2/2006 | Blach ............................ 362/606 |
| 2006/0078267 A1 * | 4/2006 | Cha et al. ...................... 385/146 |
| 2006/0164863 A1 * | 7/2006 | Chang et al. .................. 362/621 |
| 2007/0051811 A1 | 3/2007 | Chiang et al. |
| 2007/0147079 A1 * | 6/2007 | Wu et al. ....................... 362/612 |
| 2008/0094853 A1 * | 4/2008 | Kim et al. ...................... 362/612 |
| 2009/0040787 A1 | 2/2009 | Nagata et al. |
| 2009/0303417 A1 * | 12/2009 | Mizushima et al. ........... 349/65 |
| 2010/0045894 A1 * | 2/2010 | Itoh et al. ....................... 349/61 |
| 2010/0053497 A1 * | 3/2010 | Nagata et al. .................. 349/61 |
| 2010/0165013 A1 * | 7/2010 | Yamamoto et al. ........... 345/692 |
| 2010/0220261 A1 * | 9/2010 | Mizushima et al. ........... 349/64 |
| 2013/0033901 A1 | 2/2013 | Nishitani et al. |

FOREIGN PATENT DOCUMENTS

| | | |
|---|---|---|
| CN | 102844608 A | 12/2012 |
| JP | 6-138459 A | 5/1994 |
| JP | 2002-100231 A | 4/2002 |
| JP | 2003-187623 A | 7/2003 |
| JP | 2004-319514 A | 11/2004 |
| JP | 2005-64163 A | 3/2005 |
| JP | 2005-228718 A | 8/2005 |
| JP | 2005-347208 A | 12/2005 |
| JP | 2007-066701 A | 3/2007 |
| JP | 2007-520758 A | 7/2007 |
| JP | 4040027 B2 | 1/2008 |
| JP | 4049267 B2 | 2/2008 |
| JP | 2008-123725 A | 5/2008 |
| JP | 2009-64775 A | 3/2009 |
| JP | 2009-218090 A | 9/2009 |
| TW | 200712665 | 4/2007 |
| WO | WO 2008/041559 A1 | 4/2008 |
| WO | WO 2011/129117 A | 10/2011 |
| WO | WO 2012/017613 A1 | 2/2012 |
| WO | WO 2012/098739 A1 | 7/2012 |
| WO | WO 2012/099099 A1 | 7/2012 |

* cited by examiner

SURFACE LIGHT SOURCE DEVICE AND LIQUID CRYSTAL DISPLAY DEVICE

TECHNICAL FIELD

The present invention relates to a surface light source device having a planar light emitting surface, and to a liquid crystal display device having a surface light source device and a liquid crystal panel.

BACKGROUND ART

The liquid crystal display element in a liquid crystal display device does not emit light itself. Liquid crystal display devices therefore have a backlight disposed behind the liquid crystal display element as a light source to illuminate the liquid crystal display element. CCF (Cold Cathode Fluorescent) lamps, in which the inner wall of a glass tube is coated with a phosphor and from which white light can be obtained, have been the leading type of light source for backlight use. With the recent striking improvements in LED (Light Emitting Diode) performance, however, the demand for backlights using LED light sources has been rapidly expanding.

Among the devices referred to as LEDs there are monochromatic LEDs and white LEDs. A monochromatic LED emits monochromatic light such as red, green, or blue light by direct emission from the LED. A white LED has a blue LED and a yellow phosphor enclosed in a package. The yellow phosphor is excited by the blue light. White light is thereby obtained from the white LED. White LEDs in particular have high emission efficiency and are effective in reducing power consumption. White LEDs are therefore widely used as light sources for backlights. 'Monochromatic' refers to a single color with no admixture of other colors. 'Monochromatic light' is light with a single narrow wavelength width.

A white LED has a wide wavelength bandwidth. For that reason, white LEDs have the problem of a narrow color gamut. The liquid crystal display element in a liquid crystal display device has internal color filters. The liquid crystal display device renders colors by using these color filters to extract the isolated spectral wavelength ranges of red, green, and blue light. With a light source having a continuous wavelength spectrum with a wide bandwidth as found in a white LED, to widen the color gamut, it is necessary to increase the color purity of the color filters of the display colors. The color filters are therefore designed to have narrow wavelength transmission bands. If the color filters have narrow wavelength transmission bands, however, then their light utilization efficiency is reduced. The reason is that there is a large amount of unnecessary light that is not used by the liquid crystal display element of the liquid crystal display device. Further problems also arise: the brightness of the display surface of the liquid crystal display element is reduced and the power consumption of the liquid crystal display device is increased.

White LEDs are particularly deficient in energy in the red spectral band from 600 nm to 700 nm. If a color filter with a narrow wavelength bandwidth is used to increase the purity in the desired 630-640 nm wavelength band, the problem arises that the amount of light transmitted is greatly reduced. Accordingly, the problem of sharply reduced brightness arises.

As a remedy to these problems, backlights using monochromatic LEDs or lasers of high color purity have recently been proposed. High color purity means a narrow wavelength band and excellent monochromaticity. Lasers in particular have extremely good monochromaticity, and their emission efficiency is also high. By using laser light sources, it has therefore become possible to offer liquid crystal display devices that display images with high brightness and a wide color gamut. By using laser light sources, it has also become possible to offer liquid crystal display devices with low power consumption.

Monochromatic LEDs and lasers emit monochromatic light. To generate white light by using monochromatic light sources, a backlight therefore needs to have red, green, and blue light sources. That is, the backlight needs to have different light sources emitting light of the three primary colors. The backlight generates white light by mixing the light emitted from these light sources. If light sources having different angular intensity distributions are used, there will be irregularities in the spatial intensity distributions of the colors on the display surface of the liquid crystal display element. When light sources of a plurality of colors are used to generate white light, these spatial intensity distribution irregularities will show up as color irregularities. That is, when mixed to generate white light, the intensity irregularities of the light of the different colors will show up as color irregularities. Light intensity irregularities are also referred to as brightness irregularities.

To solve this problem, it is necessary to increase the planar uniformity of the spatial intensity distributions. Light emitted from light sources that differ in their emitting mechanism or in the material properties of their light emitting elements will have differing divergence angles and emission efficiencies, however. For that reason, it is necessary to provide optimal means for uniformizing the spatial intensity distributions in the planes corresponding to the light sources.

In conventional backlights, color irregularities have been suppressed by using special light guide plates matched to the characteristics of the light sources. Patent Document 1, for example, proposes a backlight having a special light guide plate for the light source of each color for use in a flat display panel. This backlight for use in a flat display panel has a different light source for each color and a light guide plate corresponding to the light source for each color. The backlight generates white illumination light by additively mixing the monochromatic planar light emitted from each light guide plate. This configuration enables the structure of each light guide plate to be optimized for the characteristics of the corresponding light source. It is accordingly possible to increase the uniformity of the planar spatial intensity distribution of each color and suppress color irregularities. A 'planar spatial intensity distribution' is a distribution representing levels of light intensity at positions expressed in a two-dimensional plane.

PRIOR ART REFERENCES

Patent Document

Patent Document 1: Japanese Patent Application Publication No. 6-138459

SUMMARY OF THE INVENTION

Problem to be Solved by the Invention

The above structure, however, uses a plurality of stacked light guide plates. The above structure therefore has the problem of increasing the size of the backlight, particularly in the thickness direction of the device.

The present invention addresses the above problem with the object of obtaining a light mixing unit, a surface light source device, and a liquid crystal display device that suppress light intensity irregularity with a compact structure by finely adjusting the angular intensity distribution of the light. A further object is to obtain a light mixing unit, a surface light source device, and a liquid crystal display device that suppress light intensity irregularity even when a plurality of light sources with different characteristics are used. A backlight is a light source for illuminating the display surface of a liquid crystal display element, so it has the function of a surface light source device.

Means for Solving the Problem

A surface light source device according to the present invention includes: a surface emitting light guide plate having a first light incidence surface, light beams incident from the first light incidence surface being emitted from the surface emitting light guide plate as planar light; a first light source disposed facing the first light incidence surface, for emitting a first light beam toward the first light incidence surface; a second light source for emitting a second light beam having a narrower angular intensity distribution than the first light beam; and an angular intensity distribution shaping member having a second light incidence surface on which the second light beam is incident, for guiding the second light beam to the first light incidence surface while changing the angular intensity distribution of the second light beam.

Effect of the Invention

The present invention can provide a compact surface light source device that suppresses intensity irregularity in light emitted from light sources having different angular intensity distributions.

MODE FOR CARRYING OUT THE INVENTION

There is also the following problem. In recent years, side lit surface light source devices, in which light emitted from the light source enters a thin surface emitting light guide plate from its side surface (light incidence surface) and diffused light is emitted from the front surface (light emitting surface) of the surface emitting light guide plate toward the entire back surface of the liquid crystal display element (liquid crystal panel), have been widely used as backlight units of liquid crystal display devices. However, since it is hard to position a large number of high-intensity light sources (such as LEDs) facing the narrow side surface of a thin surface emitting light guide plate, surface light source devices of the side lit type have suffered from difficulty in obtaining sufficiently enhanced brightness.

A surface light source device proposed as a solution to this problem includes a plurality of light sources (an array of light emitting elements) arrayed in the thickness direction of the surface light source device, a surface emitting light guide plate, and a light-path changing member (such as an optically reflecting mirror) for guiding light from the plurality of light sources to the side surface (light incidence surface) of the surface emitting light guide plate (see Japanese Patent Application Publication No. 2005-250020, for example).

In the proposed surface light source device (in Japanese Patent Application Publication No. 2005-250020), since the plurality of light sources are arrayed in the thickness direction of the surface emitting light guide plate, facing the side surface of the surface emitting light guide plate, the surface emitting light guide plate must be thickened, which consequently raises the problem of increased thickness of the surface light source device.

A liquid crystal display device using a thickened surface light source device can enhance the brightness of the display surface of the liquid crystal panel, but raises the problem of increased thickness of the liquid crystal display device.

First Embodiment

Figure 1:
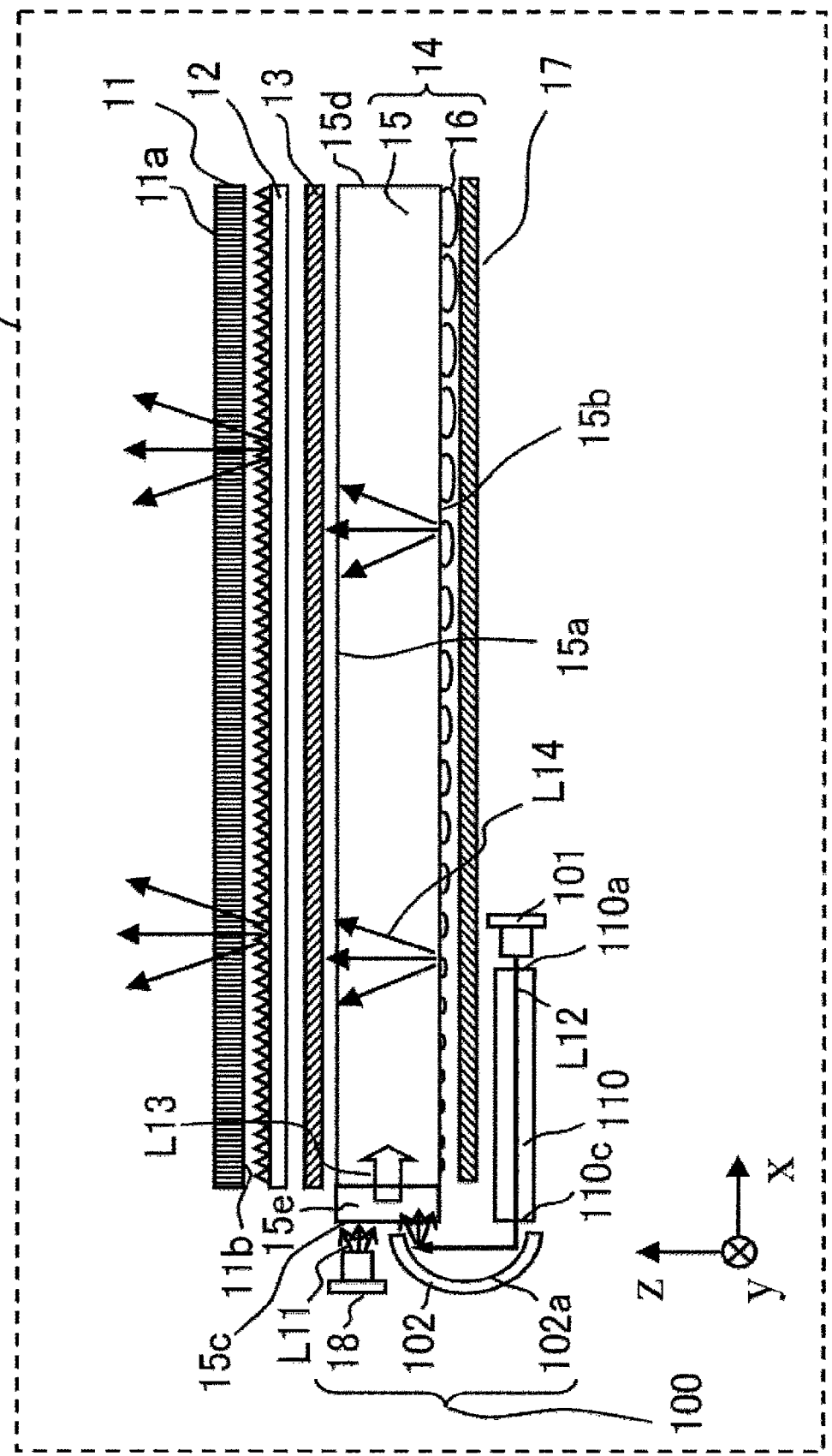
FIG. 1 is a diagram showing the structure of a liquid crystal display device according to a first embodiment.
Figure 2:
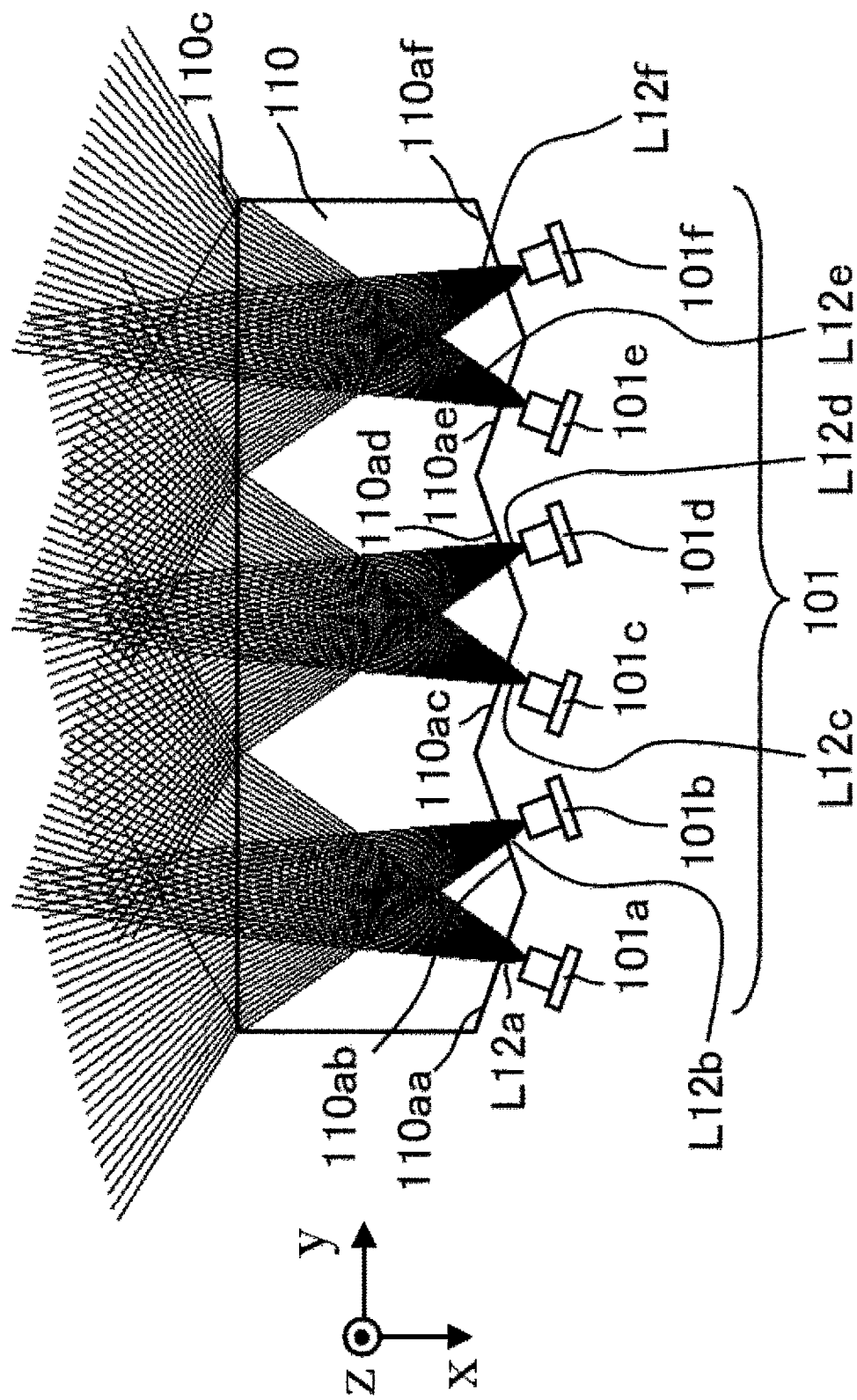
FIG. 2 is a diagram showing the structure of the angular intensity distribution shaping member in the surface light source device according to the first embodiment.
Figure 3:
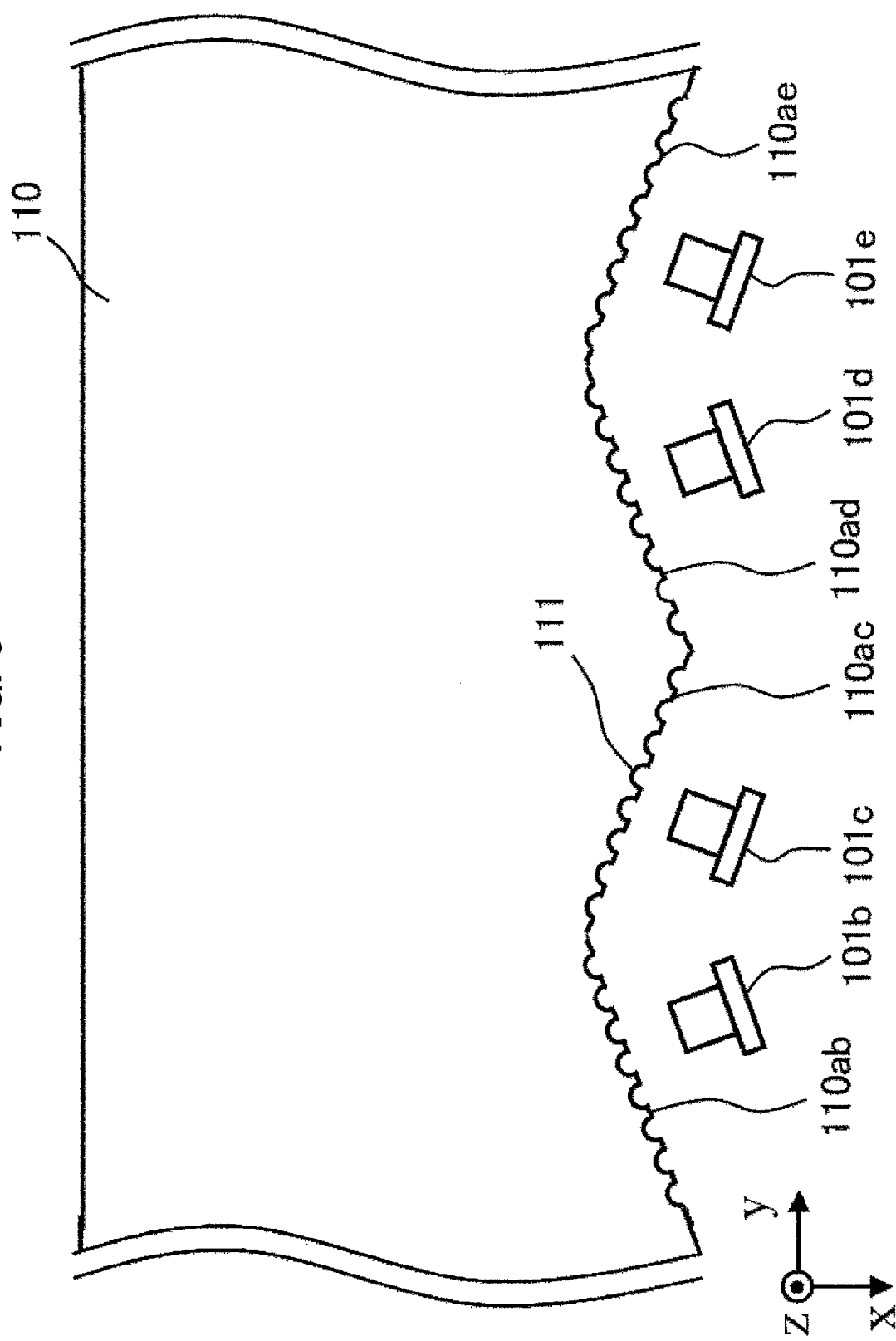
FIG. 3 is a diagram showing the structure of the angular intensity distribution shaping member in the vicinity of its incidence surface in the surface light source device according to the first embodiment.

FIG. 1 is a diagram schematically showing the structure of a liquid crystal display device 1 (including a surface light source device 100) according to a first embodiment. FIG. 2 is a diagram schematically showing the structure of the angular intensity distribution shaping member 110 shown in FIG. 1. FIG. 3 is a diagram showing the light incidence surface 110a of the angular intensity distribution shaping member 110 in greater detail.

The liquid crystal display device 1 is a transmissive liquid crystal display device including a liquid crystal display element (hereinafter, 'liquid crystal panel') 11 having a rectangular display surface 11a and an opposite back surface 11b. For ease of description, the xyz axes of a Cartesian coordinate system are shown in the drawings. In the following description, the short-side direction of the display surface 11a of the liquid crystal panel 11 is the y-axis direction (the direction perpendicular to the plane of the drawing sheet in FIG. 1), the long-side direction of the display surface 11a of the liquid crystal panel 11 is the x-axis direction (the horizontal direction in FIG. 1), and the direction perpendicular to the xy plane is the z-axis direction (the vertical direction in FIG. 1). The direction from left to right in FIG. 1 is the positive direction of the x-axis (the +x-axis direction), and the opposite direction is the negative direction of the x-axis (the −x-axis direction). The direction from the front to the back of the drawing sheet in FIG. 1 is the positive direction of the y-axis (the +y-axis direction), and the opposite direction is the negative direction of the y-axis (the −y-axis direction). The direction from bottom to top in FIG. 1 is the positive direction of the z-axis (the +z-axis direction), and the opposite direction is the negative direction of the z-axis (the −z-axis direction).

As shown in FIG. 1, the liquid crystal display device 1 according to the first embodiment includes a transmissive liquid crystal panel 11, a first optical sheet 12, a second optical sheet 13, and a surface light source device 100. The surface light source device 100 is a surface light source device that casts light onto the back surface 11b of the liquid crystal panel 11 through the second optical sheet 13 and first optical sheet 12. These components 11, 12, 13, 100 are disposed in that order from the +z-axis direction toward the −z-axis direction.

The display surface 11a of the liquid crystal panel 11 is parallel to the xy plane. The liquid crystal layer of the liquid crystal panel 11 has a planar structure extending in directions parallel to the xy plane. Normally the display surface 11a of the liquid crystal panel 11 is rectangular, and any two adjacent sides (a short side extending in the y-axis direction and a long side extending in the x-axis direction, in the first embodiment) of the display surface 11a meet at a right angle. The display surface 11a may, however, have a different shape.

As shown in FIG. 1, the surface light source device 100 includes a thin surface emitting light guide plate 15, a first light source 18, a second light source 101, and an angular intensity distribution shaping member 110. The surface light source device 100 includes a cylindrical mirror 102 for redirecting light. If necessary, the surface light source device 100 includes a light reflecting sheet 17. The surface emitting light guide plate 15, light reflecting sheet 17, and angular intensity distribution shaping member 110 are disposed in that order from the +z-axis direction toward the −z-axis direction. The cylindrical mirror 102 operates as a light-path changing member. The angular intensity distribution shaping member 110 operates to shape the angular intensity distribution of the second light source 101.

The light emitting part of the first light source 18 is disposed facing the light incidence surface 15c (side surface) of the surface emitting light guide plate 15. The first light source 18 emits a first light beam L11. The first light source 18 is, for example, a light source device having a plurality of LEDs (light emitting diodes) arranged at substantially regular intervals in the y-axis direction. The first light beam L11 emitted from the first light source 18 has a wide angular intensity distribution. In the xy plane, the first beam L11 in the first embodiment has a substantially Lambertian angular intensity distribution with a full angle of 120 degrees. The first light source 18 is disposed within the z-axis length of the light incidence surface 15c. That is, the first light source 18 is preferably disposed within the thickness range of the surface emitting light guide plate 15. FIG. 1 shows the first beam L11 emitted from the first light source 18 directly entering the surface emitting light guide plate 15 from the light incidence surface 15c. The first light beam L11 may, however, reach the light incidence surface 15c through a lens or another optical element. Incidentally, 'emit' means to emit light in a certain direction. The full angle is the angle at which the light has 50% of its maximum intensity.

The second light source 101 is disposed on the back surface side (in −z-axis direction) of the light reflecting sheet 17. The second light source 101 is, for example, a light source device having laser emission elements disposed at substantially equal intervals in the y-axis direction. The number of laser emission elements in the second light source 101 is a multiple of a natural number. This means that the number of laser emission elements is an even number. The second light beam L12 emitted from the second light source 101 has a narrow angular intensity distribution. The second light beam L12 in the first embodiment has a substantially Gaussian angular intensity distribution with a full angle of 35 degrees in the xy plane.

As shown in FIG. 2, the second light source 101 has light emitting units, which emit the second light beam L12, disposed facing in directions rotated by arbitrary angles from the −x-axis direction by rotation about the z-axis. Adjacent second light sources 101 are rotated at the same angle from the x-axis but in opposite directions. All second light sources 101 have the same angular rotation; pairs of adjacent second light sources 101 differ only in the positive-negative direction of rotation. The light emitting units that emit the second light beam L12 of the second light source 101 are disposed facing the light incidence surface 110a of the angular intensity distribution shaping member 110.

The angular intensity distribution shaping member 110 includes a plate member disposed parallel to the xy plane. The angular intensity distribution shaping member 110 is, for example, a 1-mm-thick plate member. Its dimensions are 90 mm in the x-axis direction and 255 mm in the y-axis direction. The angular intensity distribution shaping member 110 is made of a transparent acrylic resin such as PMMA.

As shown in FIG. 1, the light incidence surface 110a of the angular intensity distribution shaping member 110 faces the light emitting units of the second light source 101. The light exit surface 110c of the angular intensity distribution shaping member 110 faces the reflecting surface 102a of the cylindrical mirror 102. The cylindrical mirror 102 functions as a light-path changing member.

FIG. 2 is a diagram showing the disposition of the angular intensity distribution shaping member 110 and second light source 101. FIG. 2 shows the shape of the angular intensity distribution shaping member 110 in the xy plane. The second light source 101 has six laser emission elements 101a, 101b, 101c, 101d, 101e, 101f disposed in the y-axis direction. In FIG. 2, laser emission element 101a, laser emission element 101b, laser emission element 101c, laser emission element 101d, laser emission element 101e, and laser emission element 101f are aligned in that order from the left (the −y-axis direction in FIG. 2).

The light incidence surface 110a of the angular intensity distribution shaping member 110 has a sawtooth shape formed by alternate rotations about the z-axis to face the laser emission elements 101a, 101b, 101c, 101d, 101e, 101f. The surface facing laser emission element 101a is light incidence surface 110aa. The surface facing laser emission element 101b is light incidence surface 110ab. The surface facing laser emission element 101c is light incidence surface 110ac. The surface facing laser emission element 102d is light incidence surface 110ad. The surface facing laser emission element 102e is light incidence surface 110ae. The surface facing laser emission element 101f is light incidence surface 110af. The angular intensity distribution shaping member 110 has the same number of light incidence surfaces as the number of laser emission elements in the second light sources 101; light incidence surfaces 110aa, 110ab, 110ac, 110ad, 110ae, and 110af respectively face laser emission elements 101a, 101b, 101c, 101d, 101e, and 101f. The second light beam L12 emitted from the laser emission elements 101a, 101b, 101c, 101d, 101e, 101f is perpendicularly incident on the corresponding light incidence surfaces 110aa, 110ab, 110ac, 110ad, 110ae, 110af.

In the first embodiment, the second light beam L12 emitted from the second light source 101 is directed in directions rotated about the z-axis by ±20 degrees from the −x-axis direction. Second light beams L12a, L12c, L12e are rotated by 20 degrees clockwise, as viewed from the +z-axis direction. Second light beams L12b, L12d, L12f are rotated by 20 degrees counterclockwise, as viewed from the +z-axis direction. The second light beams L12a, L12b, L12c, L12d, L12e, L12f emitted from the laser emission elements 101a, 101b, 101c, 101d, 101e, 101f are inclined by 20 degrees in the xy plane from the light path leading from the second light source 101 toward the light incidence surface 15c. The light path shown here means the light path of the collective light flux of the second light beams L12a, L12b, L12c, L12d, L12e, L12f emitted from the laser emission elements 101a, 101b, 101c, 101d, 101e, 101f. The second light source 101 is disposed in the xy plane. That is, the light emitting units of the second light sources 101 are disposed in the xy plane. Corresponding light incidence surfaces 110aa, 110ac, 110ae are rotated from the yz plane by 20 degrees clockwise, as viewed from the +z-axis direction. Corresponding light incidence surfaces 110ab, 110ad, 110af are rotated from the yz plane by 20 degrees counterclockwise, as viewed from the +z-axis direction.

The angular intensity distribution shaping member 110 has an optical microstructure 111 on its light incidence surface 110a. The optical microstructure 111 has the effect of changing the direction of travel of incident light by refraction. In the optical microstructure 111, for example, cylindrical side shapes are formed as concave shapes at regular intervals in the y-axis direction across the light incidence surface 110a, as shown in FIG. 3. In the optical microstructure 111, that is, cylindrical side shapes are formed as concave shapes in the light incidence surface 110a. The concave shapes of the optical microstructure 111 are formed at regular intervals in the y-axis direction. The central axes of the cylinders here are parallel to the z-axis. The concave shapes shown in FIG. 3 are cylindrical side shapes cut in planes parallel to planes passing through the central axes of the cylinders. A cross section of the optical microstructure 111 cut in the xy plane has circular arc shapes that are concave on the side toward the second light source 101. A cross section of the light incidence surface 110a cut in the zx plane would have a linear shape extending in the z-axis direction.

In the xy plane, the optical microstructure 111 of the angular intensity distribution shaping member 110 in the first embodiment has concave circular arc shapes with a radius of 40 μm. The circular arc shapes are centered on planes parallel to the light incidence surfaces 110aa, 110ab, 110ac, 110ad, 110ae, 110af. The depth of the concave shapes is 20 μm. The spacing of the circular arc shapes is 80 μm, which is the distance between the centers of the circular arcs.

The second light beam L12 entering the light incidence surface 110a is diffused by the optical microstructure 111 when it enters the light incidence surface 110a. Therefore, the full angle of the angular intensity distribution of the second light beam L12 entering the angular intensity distribution shaping member 110 is larger than the full angle of the angular intensity distribution just after emission from the second light source 101. The second light beam L12 travels in random directions. The diffusing effect of the optical microstructure 111 is not considered in FIG. 2, however, to show the light path of the second light beam L12 more clearly.

The second light beam L12 emitted from the second light source 101 has a narrow angular intensity distribution with a full angle of 35 degrees in the xy plane. The angular intensity distribution is substantially a Gaussian distribution. The second light beams L12a, L12b emitted from adjacent laser emission elements 101a, 101b are additively combined in the angular intensity distribution shaping member 110. The second light beams L12c, L12d emitted from adjacent laser emission elements 101c, 102d are additively combined in the angular intensity distribution shaping member 110. The second light beams L12e, L12f emitted from adjacent laser emission elements 101e, 101f are additively combined in the angular intensity distribution shaping member 110. This gives the second light beam L12 an angular intensity distribution with a large full angle in the light exit surface 110c.

More specifically, laser emission element 101a is disposed adjacent laser emission element 101b. In FIG. 2, laser emission element 101a is rotated clockwise about the z-axis by 20 degrees from the −x-axis direction. Laser emission element 101b is rotated counterclockwise about the z-axis by 20 degrees from the −x-axis direction. Consequently, the beam axis of second light beam L12a is directed in a direction rotated clockwise about the z-axis by 20 degrees from the −x-axis direction. The beam axis of second light beam L12b is directed in a direction rotated counterclockwise about the z-axis by 20 degrees from the −x-axis direction. That is, the directions of the beam axes of the two light beams L12a, L12b are symmetric with respect to the x-axis. The beam axis here is an axis whose angular direction is a weighted mean of the angular intensity distribution of the light beam in an arbitrary plane. The weighted mean angle can be found by taking a mean of angles weighted according to their light intensity. If the position of peak light intensity is not centered in the angular intensity distribution, the beam axis angle is not at the position of peak light intensity. The beam axis angle is at the position of the areal centroid of the angular intensity distribution.

The beam axis of the angular intensity distribution of the light beam obtained by additively combining light beams L12a and L12b is directed in the −x-axis direction. The angular intensity distribution of the light beam obtained by additively combining these light beams has a wider full angle than the angular intensity distributions of the original light beams L12a, L12b. The light beam obtained by additively combining the light beams L12c, L12d emitted from adjacent laser emission elements 101c, 102d is combined in the same manner. The light beam obtained by additively combining the light beams L12e, L12f emitted from adjacent laser emission elements 101e, 101f is also combined in the same manner.

Figure 4:
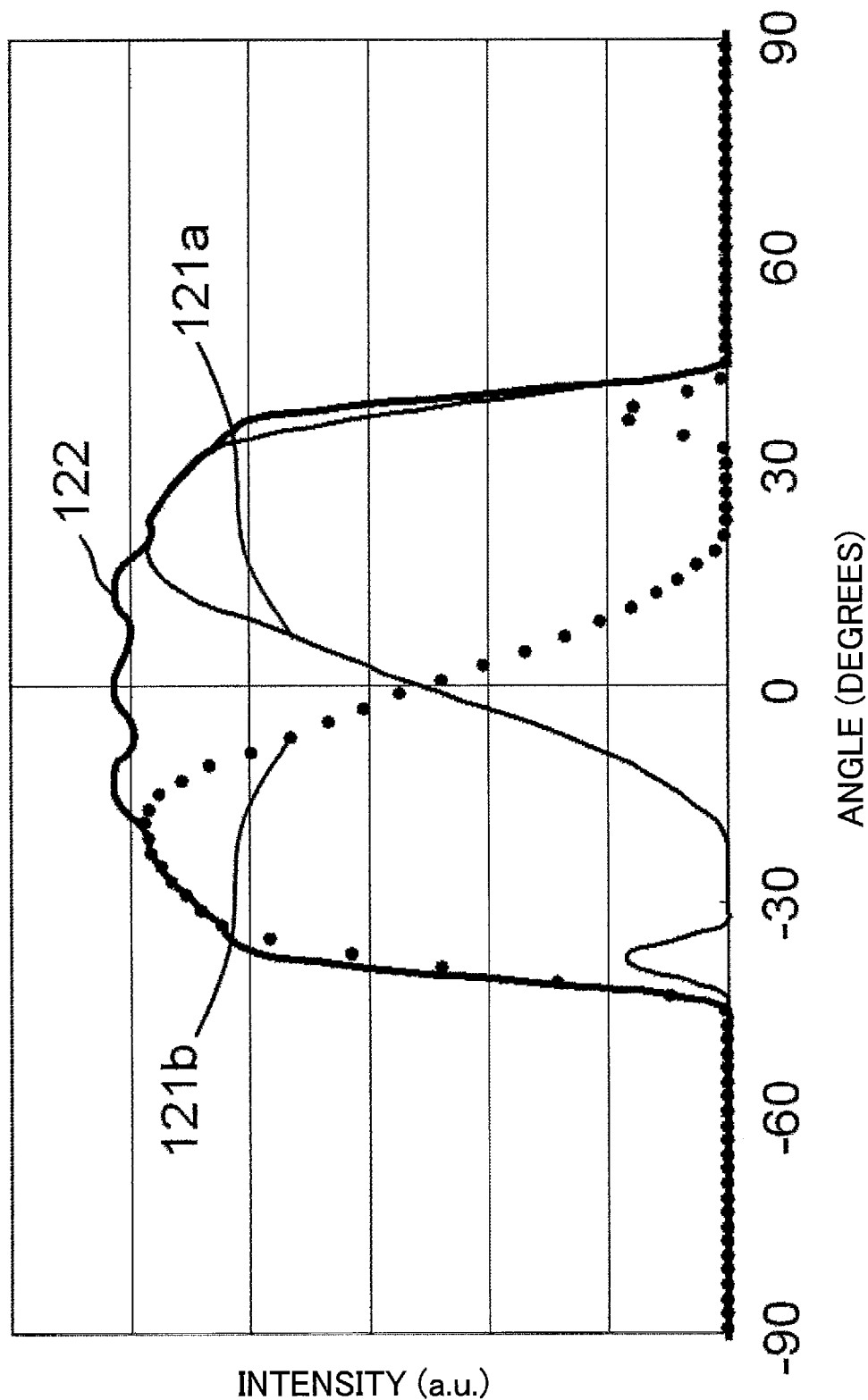
FIG. 4 is a graph showing angular intensity distributions of the second light beam in the surface emitting light guide plate according to the first embodiment.
Figure 5:
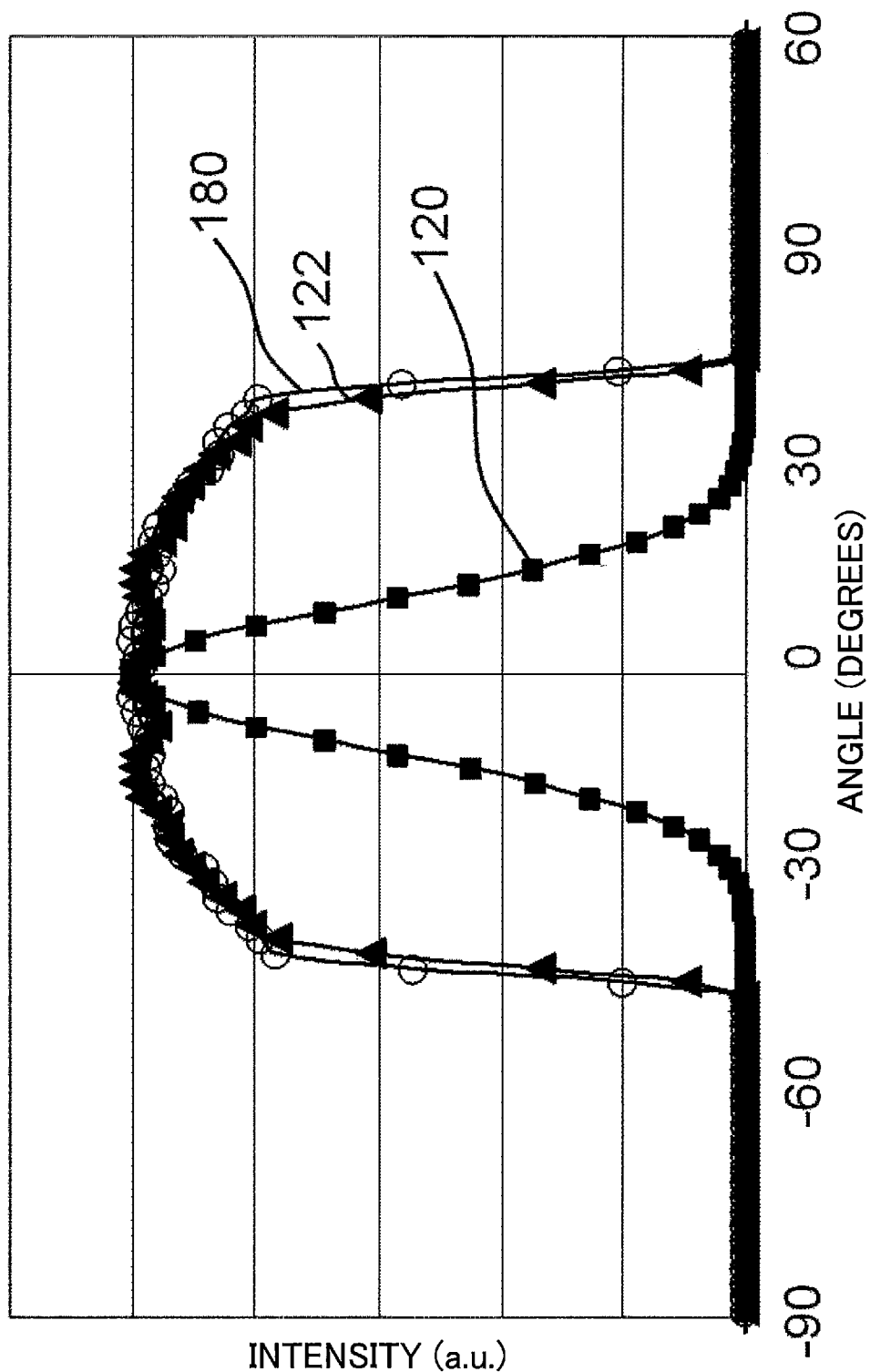
FIG. 5 is a graph showing angular intensity distributions of the first light beam and the second light beam in the surface emitting light guide plate according to the first embodiment.

FIGS. 4 and 5 are graphs showing angular intensity distributions of the first light beam L11 and second light beam L12 in the xy plane in the first embodiment. FIG. 4 shows the angular intensity distribution 122 of the light beam obtained by additively combining the angular intensity distribution 121a of second light beam L12a and the angular intensity distribution 121b of second light beam L12b on the light exit surface 110c of the angular intensity distribution shaping member 110. Angular intensity distribution 121a is the angular intensity distribution of second light beam L12a on the light exit surface 110c of the angular intensity distribution shaping member 110. Angular intensity distribution 121b is the angular intensity distribution of second light beam L12b on the light exit surface 110c of the angular intensity distribution shaping member 110. Angular intensity distribution 122 is the angular intensity distribution obtained by additively combining the angular intensity distribution of second light beam L12a and the angular intensity distribution of second light beam L12b on the light exit surface 110c of the angular intensity distribution shaping member 110. The horizontal axis represents angle (degrees), and the vertical axis represents light intensity (a.u.). The units symbol 'a.u.' indicates arbitrary units. The angles shown here are angles of rotation from the −x-axis direction about the z-axis. Viewed from the +z-axis direction, a clockwise rotation is positive and a counterclockwise rotation is negative.

The graph in FIG. 5 compares three angular intensity distributions 180, 120, 122. The three angular intensity distributions are the angular intensity distribution 180 of the first light beam L11 incident on the surface emitting light guide plate 15, the angular intensity distribution 120 of the second light beam L12 just after emission from the second light source 101, and the angular intensity distribution 122 of the second light beam L12 incident on the light exit surface 110c of the angular intensity distribution shaping member 110. Angular intensity distribution 180 is the angular intensity distribution of the first light beam L11 incident on the surface emitting light guide plate 15. Angular intensity distribution 120 is the angular intensity distribution of the second light beam L12 just after emission from the second light source 101. Angular intensity distribution 122 is the angular intensity distribution of the second light beam L12 on the light exit surface 110c of the angular intensity distribution shaping member 110. The horizontal axis represents angle (degrees), and the vertical axis represents light intensity (a.u.). The angles shown here are angles of rotation from the −x-axis direction about the z-axis. Viewed from the +z-axis direction, a clockwise rotation is positive and a counterclockwise rotation is negative.

As shown in FIG. 4, on the light exit surface 110c of the angular intensity distribution shaping member 110, second light beam L12a has maximum intensity in a direction rotated by about +20 degrees. This is because laser emission element 101a is disposed with a rotation of +20 degrees about the z-axis. On the light exit surface 110c of the angular intensity distribution shaping member 110, second light beam L12a has an angular intensity distribution that differs from the distribution when second light beam L12a was emitted from laser emission element 101a. Just after emission from laser emission element 101a, second light beam L12a has a substantially Gaussian distribution with a full angle of 35 degrees. If this second light beam L12a were to enter a member having the same refractive index as the angular intensity distribution shaping member 110, its angular intensity distribution would be narrowed by refraction, and the full angle would become about 24 degrees. The angular intensity distribution shaping member 110 in the first embodiment, however, has an optical microstructure 111 on light incidence surface 110aa. Second light beam L12a is diffused by the optical microstructure 111, and the full angle of its angular intensity distribution 121a is widened to about 40 degrees. The shape of the angular intensity distribution 121a varies gradually.

On the light exit surface 110c of the angular intensity distribution shaping member 110, second light beam L12b has maximum intensity in a direction rotated by about −20 degrees. This is because laser emission element 101b is disposed with a rotation of −20 degrees about the z-axis. On the light exit surface 110c of the angular intensity distribution shaping member 110, second light beam L12b has an angular intensity distribution that differs from the distribution when second light beam L12b was emitted from laser emission element 101b. Just after emission from laser emission element 101b, second light beam L12b has a substantially Gaussian distribution with a full angle of 35 degrees. If this second light beam L12b were to enter a member having the same refractive index as the angular intensity distribution shaping member 110, its angular intensity distribution would be narrowed by refraction, and the full width would become about 24 degrees. The angular intensity distribution shaping member 110 in the first embodiment, however, has an optical microstructure 111 on light incidence surface 110ab. Second light beam L12b is diffused by the optical microstructure 111, and the full angle of its angular intensity distribution 121b is widened to about 40 degrees. The shape of the angular intensity distribution 121b varies gradually.

Accordingly, the angular intensity distributions 121a, 121b of the two light beams have symmetric shapes on the light exit surface 110c of the angular intensity distribution shaping member 110, the center of symmetry being the x-axis (the 0 degree angle). The beam axis of the angular intensity distribution 122 of the light beam obtained by additively combining the two light beams L12a, L12b is on the x-axis (the 0 degree angle). The full angle of angular intensity distribution 122 is about 80 degrees.

As shown in FIG. 5, the angular intensity distribution in the xy plane of the second light beam L12 emitted from the second light source 101 has a substantially Gaussian distribution with a narrow full angle. With passage through the angular intensity distribution shaping member 110, the shape of the angular intensity distribution 122 of the second light beam L12 on the light exit surface 110c becomes a substantially Lambertian distribution with a wide full angle. Therefore, just after entering the surface emitting light guide plate 15, the second light beam L12 has an angular intensity distribution like that of the first light beam L11 just after it enters the surface emitting light guide plate 15.

The second light beam L12 entering the angular intensity distribution shaping member 110 travels in the angular intensity distribution shaping member 110 in the −x-axis direction. The second light beam L12 then exits through the light exit surface 110c of the angular intensity distribution shaping member 110 toward the cylindrical mirror 102. The cylindrical mirror 102 functions as a light-path changing member.

The reflecting surface 102a of the cylindrical mirror 102 is disposed facing the light exit surface 110c of the angular intensity distribution shaping member 110. The reflecting surface 102a is also disposed facing the light incidence surface 15c of the surface emitting light guide plate 15. A cross section of the reflecting surface 102a cut in the xz plane, as shown in FIG. 1, has a circular arc shape that is concave on the side toward the light incidence surface 15c. A cross section of the reflecting surface 102a cut in the xy plane would have a linear shape extending in the y-axis direction. The reflecting surface 102a is the reflecting surface of the cylindrical mirror 102. The light incidence surface 15c is an edge surface of the surface emitting light guide plate 15. The cylindrical mirror 102 functions as a light-path changing member.

In the example shown in FIG. 1, the cylindrical mirror 102 in the first embodiment has the shape of one half of a cylinder bisected in a plane passing through the axis of the cylinder (an axis parallel to the y-axis). The reflecting surface 102a of the cylindrical mirror 102 is on its concave side. The reflecting surface 102a may have the shape of a 1/n-th part of a cylinder divided into n equal parts (n being a number larger than 1) by planes passing through the axis of the cylinder (which is an axis parallel to the y-axis).

The reflecting surface 102a of the cylindrical mirror 102 has a metal layer that reflects light. The tangential direction of the reflecting surface 102a varies with position. Therefore, when a light flux (a bundle of light rays, light having size) is incident on the reflecting surface 102a, each light ray in the light flux is reflected at a different exit angle, depending on its position of incidence.

The base material of the cylindrical mirror 102 is an acrylic resin (such as PMMA). The reflecting surface 102a is aluminized by evaporation. The material and shape of the cylindrical mirror 102 are not confined to this example, however. For example, the base material may be a different resin or a metal material of high workability. The metal film deposited on the reflecting surface 102a may be a film of another metal material with high reflectivity, such as silver or gold.

After exiting the light exit surface 110c of the angular intensity distribution shaping member 110 in the −x-axis direction, the second light beam L12 is reflected twice from the reflecting surface 102a of the cylindrical mirror 102. The second light beam L12 then departs toward the light incidence surface 15c of the surface emitting light guide plate 15. The second light beam L12 traveling in the −x-axis direction is reflected by the reflecting surface 102a and changes its direction of travel to the +z-axis direction. This reflection is the first reflection. The second light beam L12 traveling in the +z-axis direction is reflected by the reflecting surface 102a and changes its direction of travel to the +x-axis direction. This reflection is the second reflection.

The cylindrical mirror 102 has a radius of curvature in the zx plane. When the second light beam L12 exits the angular intensity distribution shaping member 110 and strikes the reflecting surface 102a of the cylindrical mirror 102, the diameter in the z-axis direction of its light flux is equal to the thickness (size in the z-axis direction) of the angular intensity distribution shaping member 110. Therefore, each light ray of the second light beam L12 incident on the reflecting surface 202a of the cylindrical mirror 102 is reflected at an angle depending on its position of incidence. This broadens the angular intensity distribution of the second light beam L12. Therefore, the cylindrical mirror 102 also functions as an angular intensity distribution shaping member.

The surface emitting light guide plate 15 has a front surface 15a, a back surface 15b, and a plurality of side surfaces. The back surface 15b is opposite the front surface 15a. The plurality of side surfaces is narrow surfaces that link the front surface 15a and the back surface 15b. The surface emitting light guide plate 15 is a transparent optical member. The surface emitting light guide plate 15 has a plurality of optical microelements 16 on its back surface 15b. As shown in FIG. 1, the front surface 15a and back surface 15b are substantially parallel in the first embodiment. The surfaces of both the front surface 15a and back surface 15b are parallel to the xy plane. A plane parallel to both the front surface 15a and the back surface 15b is referred to as a reference plane of the surface emitting light guide plate 15.

The surface emitting light guide plate 15 and the optical microelements 16 constitute an optical member 14. The optical microelements 16 have the function of directing light rays that have entered from the light incidence surface 15c of the surface emitting light guide plate 15 toward its front surface 15a. In a region in which the optical microelements 16 occupy a large area, a large amount of illumination light L14 travels toward the front surface 15a. A region in which the optical microelements 16 occupy a large area may be a region in which a single optical microelement 16 occupies a large area or a region in which the optical microelements 16 are arrayed at high density. Therefore, the number of optical microelements 16 per unit area and their shapes are preferably determined so that the area occupied by the optical microelements 16 increases with increasing distance in the +x direction from the light incidence surface 15c of the surface emitting light guide plate 15.

Figure 6:
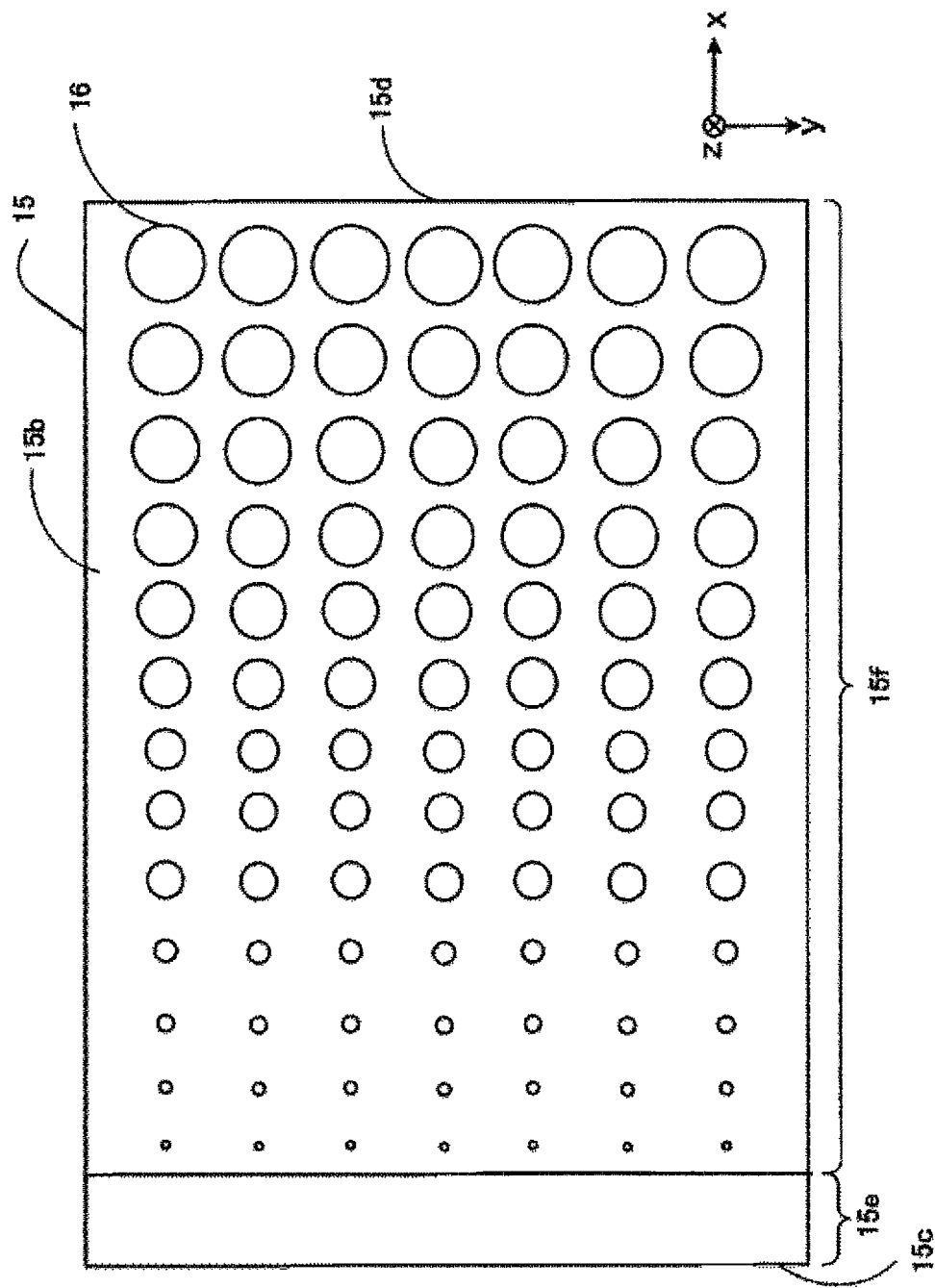
FIG. 6 is a plan view showing an arrangement of optical microelements in the surface emitting light guide plate according to the first embodiment.
Figure 7:
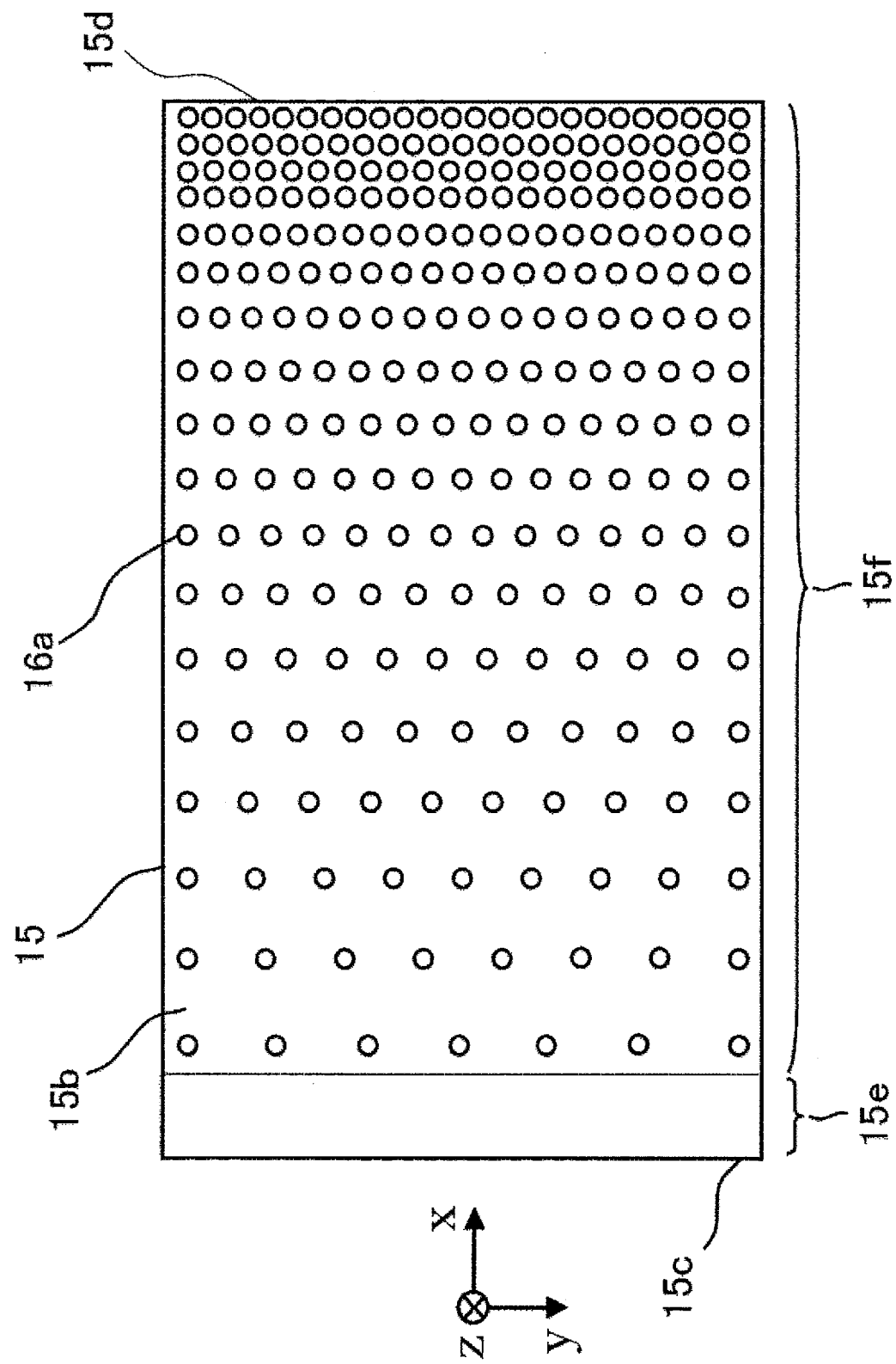
FIG. 7 is a plan view showing an arrangement of optical microelements in the surface emitting light guide plate according to the first embodiment.

The shapes of the optical microelements 16 and the number of the optical microelements 16 per unit area shown in FIGS. 1, 6, and 7 are examples. The optical microelements 16 shown in FIGS. 1 and 6 are adapted to increase the area occupied by the optical microelements 16 with increasing distance from the light incidence surface 15c in the +x direction by enlarging the shapes of the optical microelements 16. The optical microelements 16 shown in 7 are equal in size, but the density of the array of optical microelements 16 (the number of elements per unit area) increases with increasing distance from the light incidence surface 15c in the +x direction. As in these examples, the area occupied by the optical microelements 16 can be varied in accordance with the number of optical microelements 16 per unit area and the shapes of the optical microelements 16.

The front surface 15a of the surface emitting light guide plate 15 is disposed parallel to the display surface 11a of the liquid crystal panel 11. The surface emitting light guide plate 15 has a mixing region 15e of a certain length extending from the light incidence surface 15c toward the center of the surface emitting light guide plate 15. For example, the mixing region 15e is an area extending 10 mm from the light incidence surface 15c in the +x-axis direction. In the mixing region 15e, the surface emitting light guide plate 15 does not have an optical structure such as the optical microelements 16 on its front surface 15a or back surface 15b and is exposed to a layer of air. Light entering the mixing region 15e from the light incidence surface 15c travels (propagates) in the +x-axis direction by total reflection at the interface with the air layer. The 'air layer' is the air surrounding the optical member. The 'interface with the air layer' is the front surface 15a, back surface 15b, and other faces that are in contact with the air layer.

The surface emitting light guide plate 15 has optical microelements 16 on its back surface 15b in a region 15f. Region 15f is a region adjacent to the mixing region 15e in the +x-axis direction. The back surface 15b is the surface on the opposite side from the liquid crystal panel 11. The optical microelements 16 have the function of changing a mixed light beam L13 to illumination light L14. The mixed light beam L13 is a mixture of the first light beam L11 and the second light beam L12, which are mixed in the surface emitting light guide plate 15. The illumination light L14 is emitted substantially in the +z-axis direction. The illumination light L14 exits the surface emitting light guide plate 15 toward the back surface 11b of the liquid crystal panel 11.

The surface emitting light guide plate 15 is a component made of a transparent material: for example, a sheet member with a thickness of 4 mm in the z-axis direction. As shown in FIGS. 6 and 7, the surface emitting light guide plate 15 has a plurality of optical microelements 16 on its back surface 15b. The optical microelements 16 have convex hemispherical lens shapes protruding in the −z-axis direction.

The material of the surface emitting light guide plate 15 and the material of the optical microelements 16 may be, for example, an acrylic resin (PMMA). The material of the surface emitting light guide plate 15 and the material of the optical microelements 16, however, are not confined to an acrylic resin. Any material having high optical transmittance and high forming workability can be used as the material of the surface emitting light guide plate 15 and the optical microelements 16. For example, polycarbonate resin or another resin can be used instead of acrylic resin. Alternatively, a glass material can be used as the material of the surface emitting light guide plate 15 and the optical microelements 16. The thickness of the surface emitting light guide plate 15 is not limited to 4 mm, but a thin surface emitting light guide plate 15 is preferred in consideration of making the liquid crystal display device 1 both thinner and lighter.

The shape of the optical microelements 16 is not limited to a convex lens shape; the optical microelements 16 need only be members operable to reflect the mixed light beam L13 in the +z-axis direction and direct the mixed light beam L13 toward the back surface 11b of the liquid crystal panel 11. The mixed light beam L13 consists of light traveling in the surface emitting light guide plate 15 in the +x-axis direction. Provided they have this function, the optical microelements 16 may have any other shape. For example, the optical microelements 16 may be prisms or may have an irregular relief pattern.

The mixed light beam L13 is totally reflected at the interface between the surface emitting light guide plate 15 and the air layer. The mixed light beam L13 propagates in the interior of the surface emitting light guide plate 15. The mixed light beam L13 travels in the +x-axis direction, undergoing reflection as it travels. When the mixed light beam L13 encounters an optical microelement 16, however, it changes its direction of travel by reflection from the curved surface of the optical microelement 16. After its direction of travel has changed, some of the mixed light beam L13 does not satisfy the condition for total reflection at the interface between the surface of the surface emitting light guide plate 15 and the air layer. Light rays that do not satisfy the condition for total reflection exit from the front surface 15a of the surface emitting light guide plate 15 toward the back surface 11b of the liquid crystal panel 11.

The array density of the optical microelements 16 varies with position in the xy plane on the surface emitting light guide plate 15. The array density is the number of optical microelements 16 per unit area or the area occupied by the optical microelements 16 per unit area. The planar brightness distribution of the illumination light L14 can be controlled in accordance with the varying array density of the optical microelements 16. The illumination light L14 exits the surface emitting light guide plate 15. A 'planar brightness distribution' indicates levels of brightness with respect to positions expressed in two dimensions in an arbitrary plane. The plane here is the front surface 15a or the display surface 11a.

The first light beam L11 is, for example, a blue-green light beam. The second light beam L12 is, for example, a red light beam. The first light beam L11 and second light beam L12 both enter the surface emitting light guide plate 15 from the light incidence surface 15c of the surface emitting light guide plate 15. The mixing region 15e is disposed in the vicinity of the light incidence surface 15c of the surface emitting light guide plate 15. The function of the mixing region 15e is to mix the first light beam L11 and the second light beam L12. The first light beam L11 and second light beam L12 are mixed together while they both travel in the mixing region 15e, and become the mixed light beam (a white light beam, for example) L13.

The mixed light beam L13 is transformed into the illumination light L14 by the optical microelements 16 disposed on the back surface 15b of the surface emitting light guide plate 15. The illumination light L14 travels substantially in the +z-axis direction toward the back surface 11b of the liquid crystal panel 11. The illumination light L14 passes through the second optical sheet 13 and the first optical sheet 12 and illuminates the back surface 11b of the liquid crystal panel 11. The function of the first optical sheet 12 is to direct the illumination light L14 exiting the front surface 15a of the surface emitting light guide plate 15 toward the back surface 11b of the liquid crystal panel 11. The function of the second optical sheet 13 is to suppress optical effects such as minute illumination irregularities due to the illumination light L14.

The optical microelements 16 are disposed in region 15f on the back surface 15b of the surface emitting light guide plate 15. Region 15f is a region extending from a position an arbitrary length away from the light incidence surface 15c to side surface 15d. The arbitrary length is the length of the mixing region 15e. The region of region 15f in which the optical microelements 16 are disposed has approximately the same area as the valid image display region of the liquid crystal panel 11. Preferably, it has a slightly larger area than the valid image display region of the liquid crystal panel 11. The center position of region 15f is preferably the same as the center position of the valid image display region (a region parallel to the xy plane) of the liquid crystal panel 11. The center position of region 15f may be disposed in the vicinity of the center position of the valid image display region of the liquid crystal panel 11.

With the configuration described above, the illumination light L14 exiting the front surface 15a of the surface emitting light guide plate 15 illuminates the entire valid image display region of the liquid crystal panel 11. The viewer of the display surface 11a of the liquid crystal panel 11 can see an image in which brightness irregularity and color irregularity on the display surface 11a have been reduced. Peripheral darkening of the display surface 11a of the liquid crystal panel 11 can be avoided.

The surface light source device 100 has a light reflecting sheet 17. The light reflecting sheet 17 is disposed facing the back surface 15b of the surface emitting light guide plate 15. Light exiting the back surface 15b of the surface emitting light guide plate 15 is reflected by the light reflecting sheet 17, enters the surface emitting light guide plate 15 from its back surface 15b, exits from the front surface 15a of the surface emitting light guide plate 15, and becomes illumination light L14 that illuminates the back surface 11b of the liquid crystal panel 11. A light reflecting sheet having a resin base material such as polyethylene terephthalate, for example, can be used as the light reflecting sheet 17. A light reflecting sheet having metal deposited by evaporation on the surface of a base material may be used as the light reflecting sheet 17.

Figure 8:
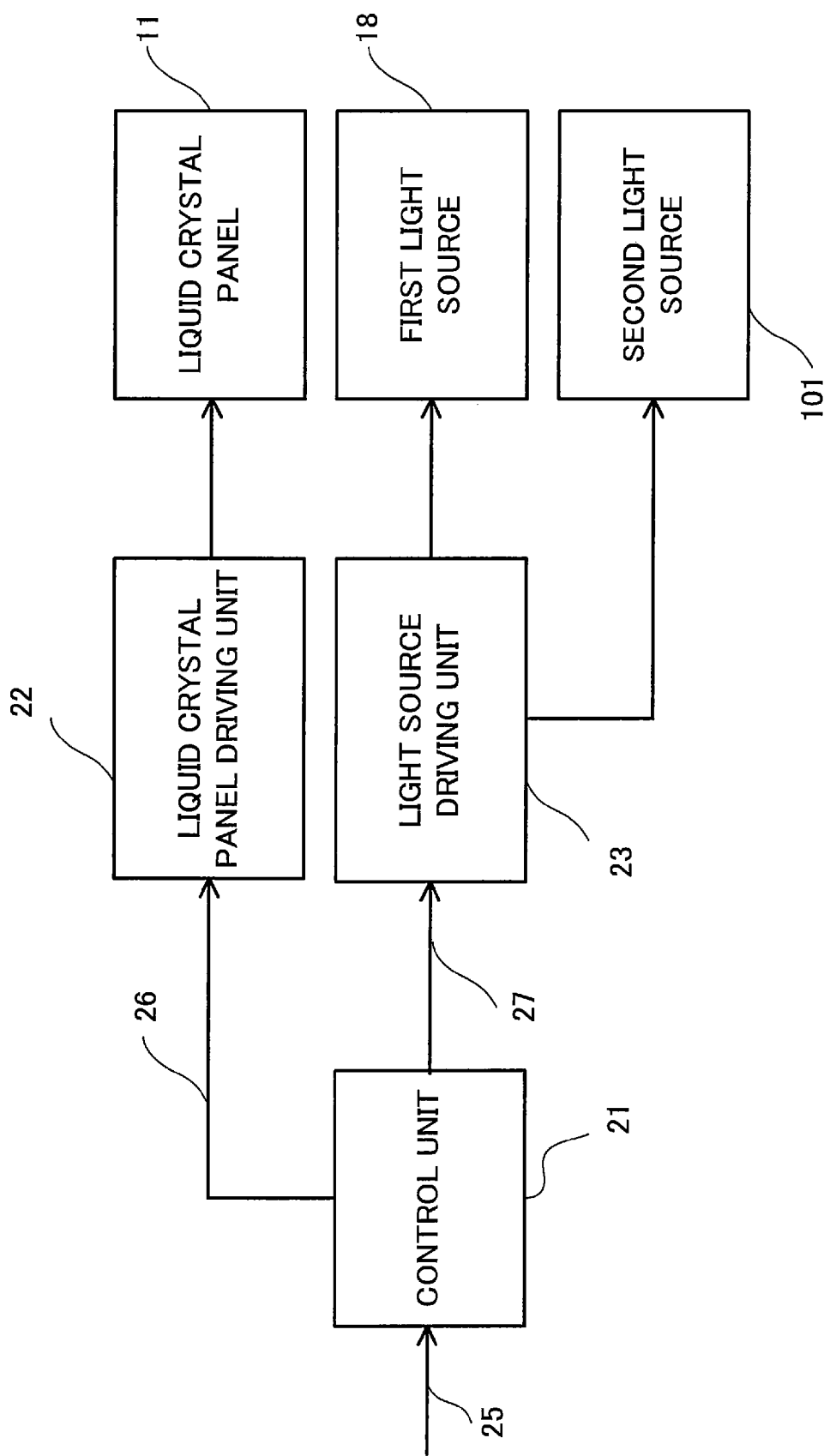
FIG. 8 is a block diagram showing the structure of the control system of the liquid crystal display device according to the first embodiment.

FIG. 8 is a block diagram showing the structure of the control system of the liquid crystal display device 1 according to the first embodiment. As shown in FIG. 8, the liquid crystal display device 1 includes the liquid crystal panel 11, a liquid crystal panel driving unit 22, the first light source 18, the second light source 101, a light source driving unit 23, and a control unit 21. The liquid crystal panel driving unit 22 drives the liquid crystal panel 11. By driving the liquid crystal panel 11 in accordance with a liquid crystal panel control signal 26, the liquid crystal panel driving unit 22 causes the liquid crystal panel 11 to display an image. The light source driving unit 23 drives both the first light source 18 and the second light source 101. By driving both the first light source 18 and the second light source 101 in accordance with a light source control signal 27, the light source driving unit 23 adjusts the brightness of the image displayed on the liquid crystal panel 11. The control unit 21 controls the operation of the liquid crystal panel driving unit 22 and the operation of the light source driving unit 23. The control unit 21 performs image processing on an input video signal 25 and generates both the liquid crystal panel control signal 26 and the light source control signal 27 on the basis of the input video signal 25. The control unit 21 supplies the liquid crystal panel control signal 26 to the liquid crystal panel driving unit 22. The control unit 21 supplies the light source control signal 27 to the light source driving unit 23.

The liquid crystal panel driving unit 22 changes the optical transmittance of the liquid crystal layer of the liquid crystal panel 11, pixel by pixel, in accordance with the liquid crystal panel control signal 26 received from the control unit 21. Each pixel of the liquid crystal panel 11 includes three sub-pixels (first to third sub-pixels): for example, one red (R) sub-pixel, one green (G) sub-pixel, and one blue (B) sub-pixel. The first sub-pixel has a color filter that transmits only red light. The second sub-pixel has a color filter that transmits only green light. The third sub-pixel has a color filter that transmits only blue light.

By having the liquid crystal panel driving unit 22 control the optical transmittance of each sub-pixel of the liquid crystal panel 11, the control unit 21 has the liquid crystal panel 11 display a color image. In other words, the liquid crystal panel 11 creates image light by spatially modulating the illumination light L14 incident from the surface emitting light guide plate 15 and outputs the image light from the display surface 11a. Here, 'image light' means light possessing image information.

The surface emitting light guide plate 15 inputs light beams L11, L12 having different angular intensity distributions emitted from the light sources 18, 101 and outputs them from the front surface 15a. Differences between the angular intensity distribution of the first light beam L11 and the angular intensity distribution of the second light beam L12 would cause brightness irregularities in the planar brightness distribution. The first light source 18 and the second light source 101 also emit light of different colors. This being the case, brightness irregularities in the planar brightness distribution would appear as color irregularities on the display surface 11a.

The surface light source device 100 in the first embodiment, however, uses the angular intensity distribution shaping member 110 to shape the very narrow angular intensity distribution of the second light beam L12 emitted from the laser emission elements 101a, 101b, 101c, 101d, 101e, 101f to substantially the same shape as the angular intensity distribution of the first light beam L11 emitted from the LED elements. The surface light source device 100 thereby suppresses the occurrence of color irregularities on the display surface 11a.

Both the blue-green first light beam L11 and the red second light beam L12 are incident on the light incidence surface 15c of the surface emitting light guide plate 15. While traveling in the mixing region 15e disposed in the vicinity of the light incidence surface 15c of the surface emitting light guide plate 15, the two light beams L11 and L12 are mixed together into a white mixed light beam L13. The optical microelements 16 then cause the mixed light beam L13 to exit the surface emitting light guide plate 15 toward the liquid crystal panel 11.

In the surface emitting light guide plate 15 according to the first embodiment, light beams L11, L12 of different colors but having equivalent angular intensity distributions enter region 15f. Region 15f has optical microelements 16. Illumination light L14 accordingly exits the surface emitting light guide plate 15 as white planar light without color irregularity in the xy plane. The control unit 21 can adjust the ratio of the brightness of the first light beam L11 to the brightness of the second light beam L12 by controlling the light source driving unit 23.

The liquid crystal display device 1 can widen the color gamut by improving the color purity of the display color. In this case, the liquid crystal display device 1 must narrow the wavelength transmission bands of the color filters of the liquid crystal panel 11. Narrowed wavelength transmission bands, however, decrease the amount of light transmitted by the color filters. Therefore, attempts to increase the color purity of the display color cause the problem of decreased brightness resulting from a decrease in the amount of light transmitted by the color filters.

The peak of the red emission spectrum of the fluorescent lamps used in the past lies in the orange wavelength region. The red emission spectrum of white LEDs using a yellow phosphor also peaks in the orange wavelength region. The peak wavelength in the red region is thereby displaced from the red region into the orange region. Attempts to increase red color purity in particular greatly decrease the amount of transmitted light, lowering the brightness significantly.

In the liquid crystal display device 1 according to the first embodiment, the first light source 18 has LED elements that emit a blue-green first light beam L11. The blue-green first light beam L11 is a mixture of blue light and green light. The second light source 101 has monochromatic laser emission elements that emit a red second light beam L12. The spectrum of the second light beam L12 has a peak around 640 nm, for example. The full-width-at-half-maximum wavelength width of the second light beam L12 is 1 nm, which is extremely narrow. The second light beam L12 therefore has high color purity. By using red laser emission elements, the second light source 101 can improve the red color purity. Accordingly, the liquid crystal display device 1 can widen the color gamut of the display.

Although a second light source 101 including laser emission elements having a peak around 640 nm has been described in the first embodiment, the present invention is not limited to this configuration. If the second light source 101 uses red laser emission elements with a shorter wavelength, the luminosity factor with respect to wavelength increases, making it possible to improve the ratio of brightness to input power, and power consumption can be decreased more effectively. The ratio of brightness to input power is the ratio of brightness that can be obtained with respect to input power. If red laser emission elements with a longer wavelength are used, the color gamut is widened, and vividly colored images can be provided.

The laser emission elements, which have a very narrow spectral width and enable color purity to be improved, also have a very narrow angular intensity distribution. In a surface light source device that fashions a white light source from these laser emission elements and LED elements with a wide angular intensity distribution, the difference in angular intensity distribution between the light beams emitted from those elements causes a problem of color irregularity.

In the surface light source device 100 of the liquid crystal display device 1 in the first embodiment, the second light beam L12 emitted from the second light source 101 passes through the angular intensity distribution shaping member 110, and the angular intensity distribution of the second light beam L12 is adjusted to the same shape as the angular intensity distribution of the first light beams L11 emitted from the LED elements. Accordingly, the surface light source device 100 can provide white planar light with reduced color irregularity.

Illumination light L14 may travel in the −z-axis direction by reflection from the first optical sheet 12, second optical sheet 13, and so on. The illumination light L14 is light that exits the surface emitting light guide plate 15 toward the liquid crystal panel 11. To improve brightness and reduce power consumption, the reflected light should be used as illumination light for the liquid crystal panel 11. The liquid crystal display device 1 according to the first embodiment includes a light reflecting sheet 17 on the −z-axis side of the surface emitting light guide plate 15. The light reflecting sheet 17 redirects light traveling in the −z-axis direction toward the +z-axis direction. The liquid crystal display device 1 can accordingly use light efficiently.

As described above, the surface light source device 100 according to the first embodiment includes a surface emitting light guide plate 15, a first light source 18, a second light source 101, an angular intensity distribution shaping member 110, and a cylindrical mirror 102. The first light source 18 is disposed in a position facing the light incidence surface 15c (a side surface) of the surface emitting light guide plate 15. The second light source 101 is disposed in a position on the back surface 15b side of the surface emitting light guide plate 15. Both the angular intensity distribution shaping member 110 and the cylindrical mirror 102 function as light-path changing members for guiding the second light beam L12 to the light incidence surface 15c.

As described above, the surface light source device 100 according to the first embodiment redirects the second light beam L12 toward the light incidence surface 15c of the surface emitting light guide plate 15 by means of the light-path changing members. Therefore, the thickness of the surface emitting light guide plate 15 can be reduced in comparison with the conventional structure, in which two types of light sources aligned in the thickness direction of the surface emitting light guide plate are disposed facing the light incidence surface of the surface emitting light guide plate.

The surface light source device 100 according to the first embodiment includes the angular intensity distribution shaping member 110. For that reason, the surface light source device 100 according to the first embodiment can make the angular intensity distribution of the second light beam L12 immediately before it enters region 15f of the surface emitting light guide plate 15 approximate the angular intensity distribution of the first light beam L11 immediately before it enters region 15f. Region 15f is a region on the back surface 15b of the surface emitting light guide plate 15 including optical microelements 16.

As described above, the surface light source device 100 uses the angular intensity distribution shaping member 110 to make the angular intensity distribution of the second light beam L12 approximate the angular intensity distribution of the first light beam L11. This suppresses the difference between the planar brightness distribution of the illumination light L14 created by the first light beam L11 and the planar brightness distribution of the illumination light L14 created by the second light beam L12. Accordingly, the surface light source device 100 can reduce color irregularity in the illumination light L14. The illumination light L14 is planar light exiting the front surface 15a of the surface emitting light guide plate 15. The illumination light L14 is also white light created by additively combining the first light beam L11 and the second light beam L12.

The liquid crystal display device 1 including the surface light source device 100 according to the first embodiment can be thinner because the thickness of the surface emitting light guide plate 15 is reduced. Since color irregularity in the surface light source device 100 can be reduced, the liquid crystal display device 1 can decrease color irregularity on the display surface 11a of the liquid crystal panel 11 and improve picture quality.

In the surface light source device 100 according to the first embodiment, the control unit 21 has the light source driving unit 23 adjust the brightness of the second light beam L12 and the brightness of the first light beam L11. The control unit 21 adjusts the amounts of light emitted by the light sources 18, 101 in accordance with the video signal 25. For that reason, the liquid crystal display device 1 can reduce its power consumption.

The liquid crystal display device 1 uses at least one type of laser emission element in its light sources. For that reason, the liquid crystal display device 1 can widen the color gamut and can provide vividly colored images with reduced color irregularity.

The surface light source device 100 according to the first embodiment also includes the angular intensity distribution shaping member 110. For that reason, the two types of light sources 18 and 101 can be disposed in separated positions. The light emitting elements used as light sources generally have electrical-to-optical conversion efficiencies of 10% to 50%. The energy that is not converted to light becomes heat. The 'light emitting elements' here are LED elements and laser emission elements.

If the two types of light sources 18, 101 were to be disposed close together, the presence of heat sources in a small area would make heat sinking difficult. An insufficient heat sinking capability would increase the ambient temperature of the two types of light sources 18, 101. As the ambient temperature rises, the emission efficiencies of the light sources 18, 101 generally decrease. It is therefore important to improve the heat sinking capability. In the liquid crystal display device 1 according to the first embodiment, the two types of light sources 18, 101 are disposed separately, and the separately disposed heat sources make it easy to regulate the temperature of the light sources 18, 101. Because of the facilitated temperature regulation, fewer heat sinking members are required, making it easier to reduce the thickness of the surface light source device 100.

The surface light source device 100 according to the first embodiment described above employs a configuration in which the two light beams L11 and L12 are incident on a short side surface (light incidence surface 15c) of the surface emitting light guide plate 15. The surface light source device 100 may, however, use a long side surface of the surface emitting light guide plate 15 as the light incidence surface. This can be done by appropriately changing the arrangement of the light sources 18, 101, the position of the cylindrical mirror 102, the arrangement of the angular intensity distribution shaping member 110 and the optical microelements 16, the shapes of the optical microelements 16, and so on.

The surface light source device 100 according to the first embodiment described above employs a configuration in which the light beams L11, L12 enter the surface emitting light guide plate 15 from a single side surface (light incidence surface 15c). The surface light source device 100 may, however, use two opposite side surfaces (such as the light incidence surface 15c and its opposite side surface 15d) of the surface emitting light guide plate 15 as light incidence surfaces. This can be done by appropriately changing the arrangement of the light sources 18, 101, the position of cylindrical mirrors 102, the arrangement of angular intensity distribution shaping members 110 and optical microelements 16, the shapes of the optical microelements 16, and so on.

The light source driving unit 23 of the surface light source device 100 according to the first embodiment individually controls both the output of the first light source 18 and the output of the second light source 101 in accordance with the video signal 25. The surface light source device 100 can therefore operate with reduced power consumption. In addition, the surface light source device 100 can provide improved contrast by reducing stray light. This is because stray light can be reduced by reducing excess light. 'Stray light' is light that travels off the normal light path in an optical device and is detrimental to the intended purpose of the device.

The liquid crystal display device 1 according to the first embodiment employs blue-green LED elements for the first light source 18 and red laser emission elements for the second light source 101. The present invention is not limited to this configuration, however. For example, the present invention can be applied in any liquid crystal display device having a plurality of differing light sources, if it has both a light source with a wide angular intensity distribution and a light source with a narrow angular intensity distribution.

The present invention can also be applied to a configuration in which, for example, a fluorescent lamp emitting blue-green light is employed as the first light source 18 and red laser emission elements are employed as the second light source 101. In that case, the fluorescent lamp and laser emission elements can generate white light. The present invention can further be applied to a configuration in which blue LED elements and red LED elements are employed as the first light source 18 and green laser emission elements are employed as the second light source 101. In that case, the LED elements and laser emission elements can generate white light. Moreover, green LED elements can be used as the first light source 18, and blue laser emission elements and red laser emission elements can be used as the second light source 101.

In the description given above, the surface light source device 100 is used as the backlight unit of a liquid crystal display device 1, but the surface light source device can also be used for other purposes, such as illumination.

Second Embodiment

Figure 9:
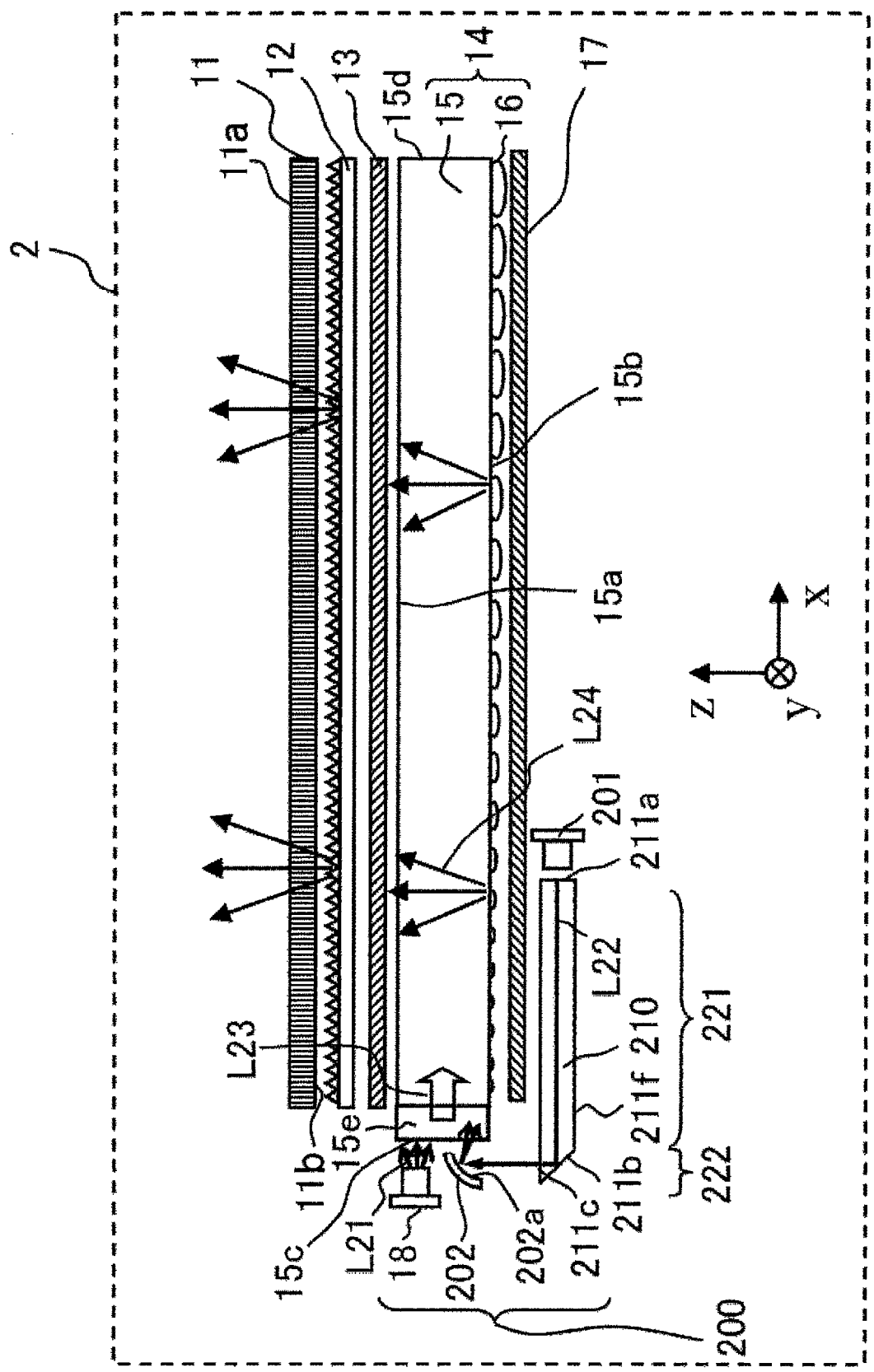
FIG. 9 is a diagram showing the structure of a liquid crystal display device according to a second embodiment.

FIG. 9 is a diagram schematically showing the structure of a liquid crystal display device 2 (including a surface light source device 200) according to a second embodiment. In place of the angular intensity distribution shaping member 110 in the first embodiment, the surface light source device 200 according to the second embodiment includes an angular intensity distribution shaping member 210 having a different shape. In place of the cylindrical mirror 102 in the first embodiment, the surface light source device 200 according to the second embodiment includes a cylindrical mirror 202 having a different shape. The cylindrical mirror 202 functions as a light-path changing member. Components identical to components in the first embodiment shown in FIG. 1 will be denoted by the same reference characters, and descriptions of those components will be omitted. Of the components in the second embodiment shown in FIG. 9, the identical components are the liquid crystal panel 11, optical sheets 12, 13, surface emitting light guide plate 15, optical microelements 16, light reflecting sheet 17, and first light source 18.

Figure 10:
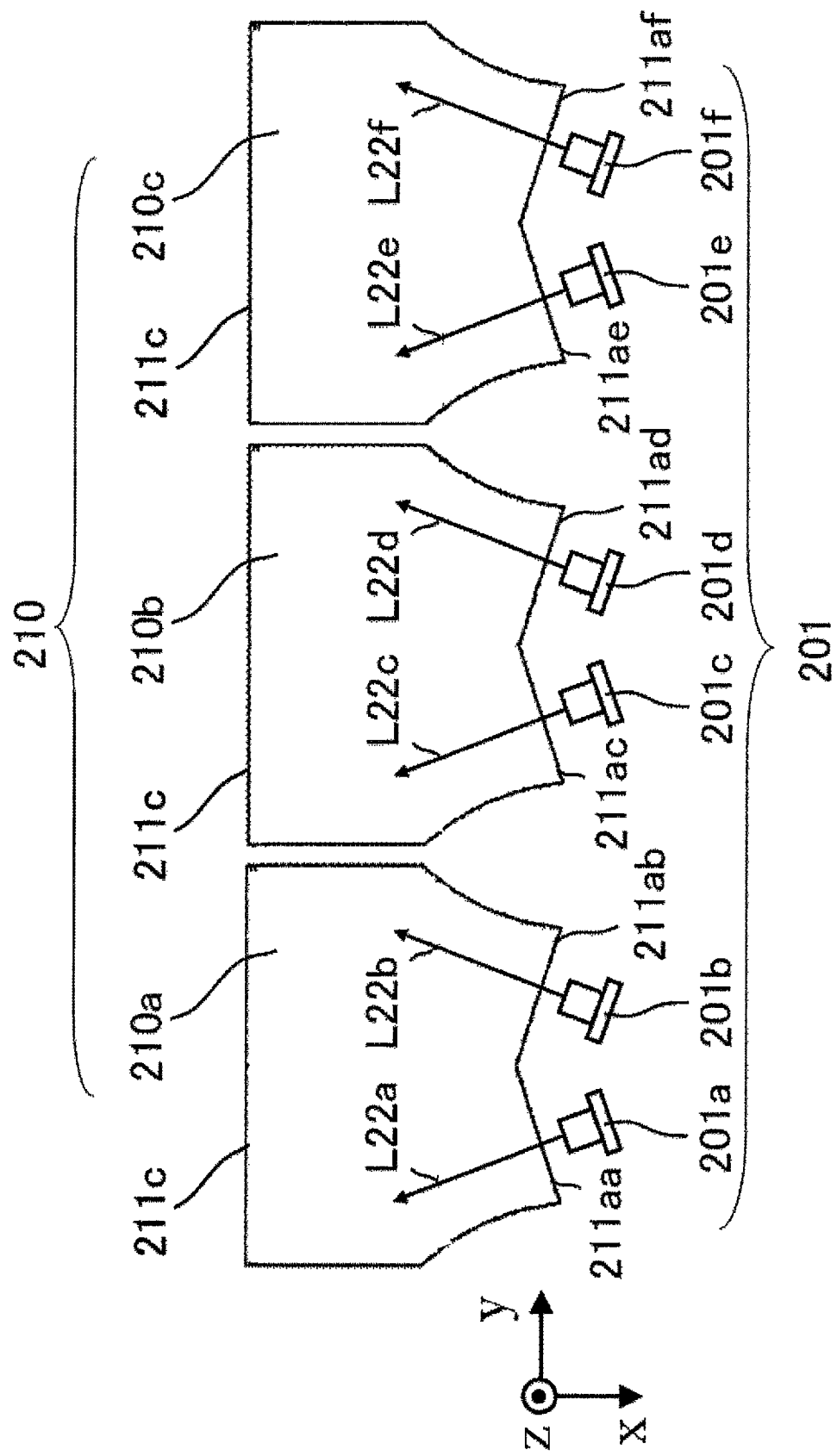
FIG. 10 is a diagram showing the structure of the angular intensity distribution shaping member in the surface light source device according to the second embodiment.
Figure 11:
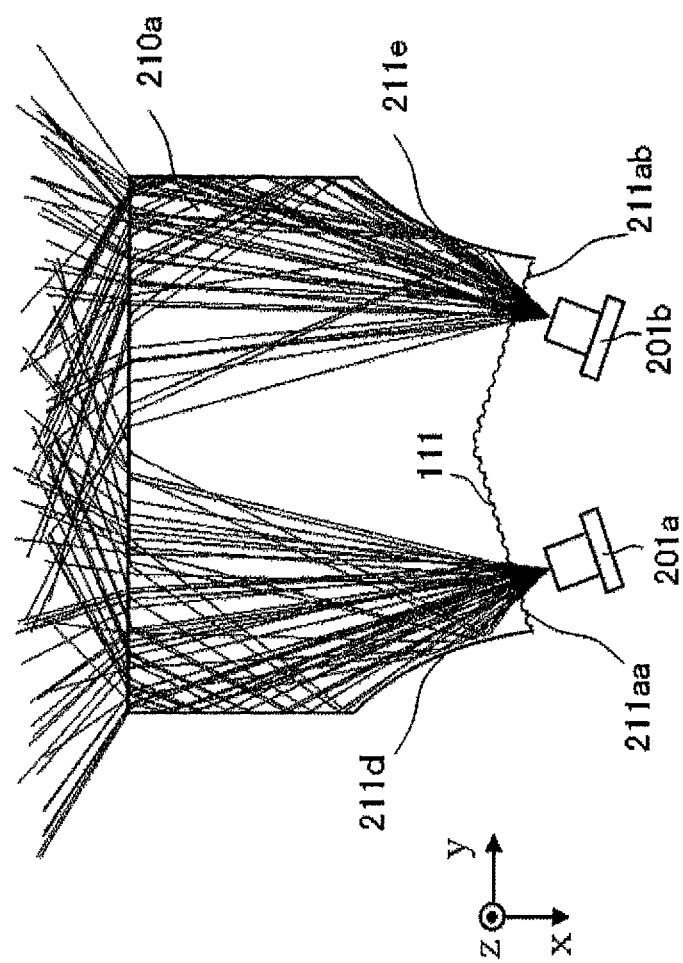
FIG. 11 is a diagram showing the structure of the angular intensity distribution shaping member in the surface light source device according to the second embodiment.

FIG. 10 is a diagram showing the structure of the angular intensity distribution shaping member 210 in the second embodiment, viewed from the +z-axis direction. As shown in FIG. 10, the angular intensity distribution shaping member 202 includes three angular intensity distribution shaping members 210a, 210b, 210c aligned in the y-axis direction. The angular intensity distribution shaping members 210a, 210b, 210c have identical shapes. The angular intensity distribution shaping members 210a, 210b, 210c are made of identical materials. The angular intensity distribution shaping members 210a, 210b, 210c therefore all have the same performance. FIG. 11 is a diagram showing the structure of angular intensity distribution shaping member 210a, viewed from the +z-axis direction.

The angular intensity distribution shaping member 210 is a plate member disposed parallel to the xy plane. For example, the angular intensity distribution shaping member 210 is a plate member having a thickness of 1 mm. Its dimensions are 70 mm in the x-axis direction and 85 mm in the y-axis direction. The angular intensity distribution shaping member 210 is made of a transparent acrylic resin such as PMMA.

As shown in FIG. 11, the light incidence surface 211a of angular intensity distribution shaping member 210a has two light incidence surfaces 211aa, 211ab. Light incidence surface 211aa faces laser emission element 201a. Light incidence surface 211ab faces laser emission element 201b. Laser emission element 201a is rotated counterclockwise about the z-axis by 18 degrees from the −x-axis direction. The beam axis of the second light beam L22a emitted from laser emission element 201a is directed in a direction rotated counterclockwise about the z-axis by 18 degrees from the −x-axis direction. Laser emission element 201b is rotated clockwise about the z axis by 18 degrees from the −x-axis direction. The beam axis of the second light beam L22b emitted from laser emission element 201b is accordingly directed in a direction rotated clockwise about the z-axis by 18 degrees from the −x-axis direction. When the xy plane is viewed from the +z-axis side, the direction of clockwise rotation about the z-axis is the positive direction, and the direction of counterclockwise rotation is the negative direction. The beam axis here is an axis whose angular direction is a weighted mean of the angular intensity distribution of the light beam in an arbitrary plane. The weighted mean angle can be found by taking a mean of angles weighted according to their light intensity. If the position of peak light intensity is not centered in the angular intensity distribution, the beam axis angle is not at the position of peak light intensity. The beam axis angle is at the position of the areal centroid of the angular intensity distribution.

Light incidence surface 211aa of angular intensity distribution shaping member 210a is perpendicular to the beam axis of second light beam L22a. Second light beam L22a is perpendicularly incident on light incidence surface 211aa. Light incidence surface 211ab of angular intensity distribution shaping member 210a is perpendicular to the beam axis of second light beam L22b. Second light beam L22b is perpendicularly incident on light incidence surface 211ab.

Light incidence surface 211a of angular intensity distribution shaping member 210b has two light incidence surfaces 211ac, 211ad. Light incidence surface 211ac faces laser emission element 201c. Light incidence surface 211ad faces laser emission element 201d. Laser emission element 201c is rotated counterclockwise about the z-axis by 18 degrees from the −x-axis direction. Therefore, the beam axis of the second light beam L22c emitted from laser emission element 201c is directed in a direction rotated counterclockwise about the z-axis by 18 degrees from the −x-axis direction. Laser emission element 202d is rotated clockwise about the z-axis by 18 degrees from the −x-axis direction. Therefore, the beam axis of the second light beam L22d emitted from the laser emission element 202d is directed in a direction rotated clockwise about the z-axis by 18 degrees from the −x-axis direction.

Light incidence surface 211ac of angular intensity distribution shaping member 210b is perpendicular to the beam axis of second light beam L22c. Second light beam L22c is perpendicularly incident on light incidence surface 211ac. Light incidence surface 211ad of angular intensity distribution shaping member 210b is perpendicular to the beam axis of second light beam L22d. Second light beam L22d is perpendicularly incident on light incidence surface 211ad.

Light incidence surface 211a of angular intensity distribution shaping member 210c has two light incidence surfaces 211ae, 211af. Light incidence surface 211ae faces laser emission element 201e. Light incidence surface 211af faces laser emission element 201f. Laser emission element 202e is rotated counterclockwise about the z-axis by 18 degrees from the −x-axis direction. Therefore, the beam axis of the second light beam L22e emitted from laser emission element 202e is directed in a direction rotated counterclockwise about the z-axis by 18 degrees from the −x-axis direction. Laser emission element 201f is rotated clockwise about the z-axis by 18 degrees from the −x-axis direction. Therefore, the beam axis of the second light beam L22f emitted from laser emission element 201f is directed in a direction rotated clockwise about the z-axis by 18 degrees from the −x-axis direction.

Light incidence surface 211ae of angular intensity distribution shaping member 210c is perpendicular to the beam axis of second light beam L22e. Second light beam L22e is perpendicularly incident on light incidence surface 211ae. Light incidence surface 211af of angular intensity distribution shaping member 210f is perpendicular to the beam axis of second light beam L22f. Second light beam L22f is perpendicularly incident on light incidence surface 211af.

FIG. 11 is a diagram showing the structure of angular intensity distribution shaping member 210a. As shown in FIG. 11, angular intensity distribution shaping member 210a has an optical microstructure 111 on both light incidence surface 211aa and light incidence surface 211ab. The optical microstructure 111 operates to change the direction of travel of incident light by refraction. In the optical microstructure 111, for example, cylindrical side shapes are formed as concave shapes in both light incidence surfaces 211aa and 211ab, as shown in FIG. 11. The concave shapes of the optical microstructure 111 are formed at regular intervals in the y-axis direction. The central axes of the cylinders here are parallel to the z-axis. The concave shapes shown in FIG. 11 are side shapes cut in planes parallel to planes passing through the central axes of the cylinders. A cross section of the optical microstructure 111 in the xy plane has circular arc shapes that are concave on the side toward the laser emission elements 201a, 201b. A cross section of the light incidence surfaces 211aa, 2111aa, cut in the zx plane would have a linear shape extending in the z-axis direction. Angular intensity distribution shaping members 210b and 210c have the same shape as angular intensity distribution shaping member 210a.

In the xy plane, the optical microstructure 111 of the angular intensity distribution shaping member 210 in the second embodiment has concave circular arc shapes with a radius of 40 μm. The circular arc shapes are centered on planes parallel to the light incidence surfaces 211aa, 211ab, 211ac, 211ad, 211ae, 211af. The depth of the concave shapes is 20 μm. The spacing of the circular arc shapes is 80 μm, which is the distance between the centers of the circular arcs.

The second light beam L22 entering light incidence surface 211a is diffused by the optical microstructure 111 when it enters light incidence surface 211a. Therefore, the full angle of the angular intensity distribution of the second light beam L22 entering the angular intensity distribution shaping member 210 is larger than the full angle of the angular intensity distribution just after emission from the second light source 201. The second light beam L22 travels in random directions.

The second light beam L22 emitted from the second light source 201 has a narrow angular intensity distribution with a full angle of 35 degrees in the xy plane. The angular intensity distribution is substantially a Gaussian distribution. After entering angular intensity distribution shaping member 210a, the second light beam L22a emitted from laser emission element 201a and the second light beam L22b emitted from laser emission element 201b are additively combined in angular intensity distribution shaping member 210a. The light beam L22 exiting its light exit surface 211c has a light intensity distribution obtained by additively combining the light intensity distribution of light beam L22a and the light intensity distribution of light beam L22b.

After entering angular intensity distribution shaping member 210b, the second light beam L22c emitted from laser emission element 201c and the second light beam L22d emitted from laser emission element 202d are additively combined in angular intensity distribution shaping member 210b. The light beam L22 exiting its light exit surface 211c has a light intensity distribution obtained by additively combining the light intensity distribution of light beam L22c and the light intensity distribution of light beam L22d.

After entering the angular intensity distribution shaping member 210c, the second light beam L22e emitted from laser emission element 202e and the second light beam L22f emitted from laser emission element 201f are additively combined in angular intensity distribution shaping member 210c. The light beam L22 exiting its light exit surface 211c has a light intensity distribution obtained by additively combining the light intensity distribution of light beam L22e and the light intensity distribution of light beam L22f.

For those reasons, the full angle of the angular intensity distribution of the second light beam L22 on the light exit surface 211c is greater than the full angle at emission from the second light source 201.

More specifically, laser emission element 201a is disposed adjacent laser emission element 201b. In FIG. 11, laser emission element 201a is rotated counterclockwise about the z-axis by 18 degrees from the −x-axis direction. The laser emission element 201b is rotated clockwise about the z-axis by 18 degrees from the −x-axis direction. Consequently, the beam axis of second light beam L22a is directed in a direction rotated counterclockwise about the z-axis by 18 degrees from the −x-axis direction. The beam axis of second light beam L22b is directed in a direction rotated clockwise about the z-axis by 18 degrees from the −x-axis direction. That is, the directions of the beam axes of the two light beams L22a, L22b are symmetric with respect to the x-axis.

As shown in FIG. 11, the angular intensity distribution shaping member 210 has adjustment surfaces 211d, 212e on its side surfaces in the y-axis direction for adjusting the angular intensity distribution. Adjustment surfaces 211d, 212e have a concave circular arc shape in the xy plane. Cross sections cut in the yz plane would have linear shapes extending in the z-axis direction. Adjustment surface 211d is formed in the side surface located in the −y-axis direction from laser emission element 201a. Of the light flux of second light beam L22a, rays emitted in the −y-axis direction are reflected by adjustment surface 211d. Adjustment surface 212e is formed in the side surface located in the +y-axis direction from laser emission element 201b. Of the light flux of second light beam L22b, light rays emitted in the +y-axis direction are reflected by adjustment surface 211e.

Without adjustment surfaces 211d, 211e, these light rays would belong to the peripheral part of the light flux obtained by additively combining second light beams L22a and L22b. These light rays would become peripheral rays in the angular intensity distribution at the light exit surface 211c of angular intensity distribution shaping member 210a. These light rays change their directions of travel by reflection from adjustment surfaces 211d, 211e. The directions of travel of the light beams L22a, L22b incident on adjustment surfaces 211d, 212e can be adjusted by adjusting their angles of incidence. That is, the shape of the angular intensity distribution of the light beam obtained by additively combining second light beams L22a and L22b can be adjusted by changing the shapes of the adjustment surfaces 211d, 211e. The light beam obtained by additively combining the second light beams L22a, L22b is the light beam that exits the light exit surface 211c. 'These light rays' are light rays in the light flux of second light beam L22a that are emitted in the −y-axis direction and light rays in the light flux of second light beam L22b that are emitted in the +y-axis direction.

The beam axes of the two second light beams L22a, L22b emitted from the adjacent laser emission elements 201a, 201b are symmetrically inclined with respect to the x-axis. The beam axis of the angular intensity distribution of the light beam obtained by additively combining the two second light beams L22a, L22b is parallel to the x-axis. The full angle of the angular intensity distribution of the light beam obtained by additively combining the two second light beams L22a, L22b is larger than the full angle before entry to the angular intensity distribution shaping member 210. The full angle of the angular intensity distribution of the light beams emitted from laser emission elements 201c and 202d can also be increased in the same manner. The full angle of the angular intensity distribution of the light beams emitted from laser emission elements 202e and 201f can also be increased in the same manner.

The adjustment surfaces 211d, 212e of angular intensity distribution shaping member 210a in the second embodiment have a concave circular arc shape. Adjustment surface 211d can redirect light rays on the −y-axis side in second light beam L22a toward the +y-axis direction. Adjustment surface 212e can redirect light rays on the +y-axis side in second light beam L22b toward the −y-axis direction. As a result, the directions of travel of light rays that would become peripheral light rays of the light beam obtained by additively combining second light beams L22a and L22b if the adjustment surfaces 211d, 212e were not provided can be brought closer to the vicinity of the angular center.

The adjustment surfaces 211d, 212e of the angular intensity distribution shaping member 210 in the second embodiment have a concave circular arc shape. However, the present invention is not limited that shape. For example, the adjustment surfaces 211d, 212e may have a convex circular arc shape or a linear shape. They may also have a shape including plural arrays of plural concave circular arc shapes. The shapes of the adjustment surfaces 211d, 212e can be changed to shape the angular intensity distribution of the second light beam L22 as required.

The angular intensity distribution shaping member 210 in the second embodiment includes three angular intensity distribution shaping members 210a, 210b, 210c. Angular intensity distribution shaping members 210b, 210c have the same shapes and functions as angular intensity distribution shaping member 210a.

Although the angular intensity distribution shaping member 210 in the second embodiment includes three angular intensity distribution shaping members 210a, 210b, 210c, the present invention is not limited to a three-piece structure. The number of pieces may be increased, provided they are disposed in the longitudinal direction (y-axis direction) of the light incidence surface 15c of the surface emitting light guide plate 15. The number of angular intensity distribution shaping members 210 also increases or decreases depending on factors such as the number of laser emission elements included in the second light source 201.

The angular intensity distribution of the second light beam L22 emitted from the second light source 201 is a substantially Gaussian distribution with a narrow full angle in the xy plane. After passage through the angular intensity distribution shaping member 210, the angular intensity distribution of the second light beam L22 on the light exit surface 211c has a shape with a wide full angle. Just after entering the surface emitting light guide plate 15, the second light beam L22 has an angular intensity distribution that substantially approximates the angular intensity distribution of the first light beam L21 just after it enters the surface emitting light guide plate 15.

The angular intensity distribution shaping member 210 includes a plate section 221 and a light folding section 222. The plate section 221 is disposed parallel to the xy plane. The light folding section 222 has an inclined surface 211b inclined by about 45 degrees with respect to the xy plane. The inclined surface 211b is parallel to a plane that passes through the y-axis and is inclined by about 45 degrees with respect to the xy plane. The angular intensity distribution shaping member 210 is, for example, a plate member having a thickness of 1 mm. The angular intensity distribution shaping member 210 is made of, for example, a transparent acrylic resin such as PMMA.

The angle of incidence of the second light beam L22 with respect to the inclined surface 211b is adjusted so that the whole of the second light beam L22 is totally reflected by the inclined surface 211b of the angular intensity distribution shaping member 210. Light loss in the second light source 201 is thereby suppressed.

If a light beam enters a layer of air having a refractive index of 1.00 from an acrylic resin member having a refractive index of 1.49, for example, the critical angle θt that satisfies the condition for total reflection is expressed by the formula (1) below in accordance with Snell's law.

$$\theta t = \sin^{-1}(1.00/1.49) \approx 42.16° \quad (1)$$

If the angular intensity distribution of the second light beam L22 has a full angle of α, the angle of incidence of the second light beam L22 on the inclined surface 211b is preferably (θt+α/2) or greater.

As shown in FIG. 9, the angular intensity distribution shaping member 210 has a light incidence surface 211a, an inclined surface 211b, and a light exit surface 211c. The light exit surface 211c faces the reflecting surface 202a of the cylindrical mirror 202. The inclined surface 211b is tilted at an angle of about 45 degrees with respect to the xy plane. The inclined surface 211b changes the direction of travel of the second light beam L22 from the −x-axis direction to substantially the +z-axis direction. That is, the second light beam L22 is reflected by the inclined surface 211b and changes its direction of travel to substantially the +z-axis direction. Reflection of the second light beam L22 occurs because of the difference in refractive index at the interface between the angular intensity distribution shaping member 210 and the layer of air.

The behavior of the second light beam L22 viewed in the zx plane will now be described. The second light beam L22 is emitted from the second light source 201. The second light beam L22 enters the angular intensity distribution shaping member 210 from the light incidence surface 211a of the angular intensity distribution shaping member 210. The second light beam L22 is totally reflected at the interface between the angular intensity distribution shaping member 210 and the air layer and travels in the −x-axis direction in the angular intensity distribution shaping member 210. When the second light beam L22 reaches the inclined surface 211b, it is reflected by the inclined surface 211b and changes its direction of travel to substantially the +z-axis direction. After changing its direction of travel and exiting through the light exit surface 211c, the second light beam L22 is reflected by the cylindrical mirror 202 and enters the surface emitting light guide plate 15 from its light incidence surface 15c. The cylindrical mirror 202 functions as a light-path changing member.

The reflecting surface 202a of the cylindrical mirror 202 is disposed facing the light exit surface 211c of the angular intensity distribution shaping member 210. The reflecting surface 202a of the cylindrical mirror 202 is also disposed facing the light incidence surface 15c of the surface emitting light guide plate 15. The cross section of the reflecting surface 202a cut in the xz plane, as shown in FIG. 9, has a circular arc shape that is concave on the side toward the light incidence surface 15c. A cross section of the reflecting surface 202a cut in the xy plane would have a linear shape extending in the y-axis direction. The reflecting surface 202a is the reflecting surface of the cylindrical mirror 202. The cylindrical mirror 202 is a light-path changing member.

In the example shown in FIG. 9, the cylindrical mirror 202 in the second embodiment has the shape of one quarter of an elliptic cylinder with an eccentricity of 0.47. The long axis of the ellipse is parallel to the x-axis. The concave surface of the cylindrical mirror 202 is the reflecting surface 202a. The reflecting surface 202a may have a shape of a 1/n-th part of a cylinder divided into n equal parts (n being a number larger than 1) by planes passing through the axis of the cylinder (which is an axis parallel to the y-axis).

The reflecting surface 202a of the cylindrical mirror 202 has a metal layer that reflects light. The tangential direction of the reflecting surface 202a varies with position on the reflecting surface 202a. Therefore, when a light flux (a bundle of light rays, light having size) is incident on the reflecting surface 202a, each light ray is reflected at a different exit angle, depending on its position of incidence.

The base material of the cylindrical mirror 202 is acrylic resin (such as PMMA). The reflecting surface 202a is aluminized by evaporation. The material and shape of the cylindrical mirror 202 are not confined to this example, however. For example, the base material may be a different resin or a metal material of high workability. The metal film deposited on the reflecting surface 202a may be a film of another metal material with high reflectivity, such as silver or gold.

Viewed in the zx plane, the second light beam L22 propagating in the angular intensity distribution shaping member 210 travels in the −x-axis direction by total reflection from the light exit surface 211c and surface 211f. Surface 211f is the surface opposite the light exit surface 211c. The light exit surface 211c and the opposite surface 211f are mutually parallel. The beam axis of the second light beam L22 is parallel to those surfaces. 'Those surfaces' are the light exit surface 211c and surface 211f.

Accordingly, the angular intensity distribution of the second light beam L22 propagating in the angular intensity distribution shaping member 210 is preserved. This means that the angular intensity distribution in the zx plane of the second light beam L22 exiting the light exit surface 211c is the same as the angular intensity distribution in the zx plane of the second light beam L22 just after emission from the second light source 201. After exiting the light exit surface 211c, the second light beam L22 strikes the cylindrical mirror 202, is reflected by the reflecting surface 202a, and redirects its direction of travel toward the light incidence surface 15c of the surface emitting light guide plate 15 (roughly in the +x-axis direction).

The first light beam L21 emitted from the first light source 18 enters the surface emitting light guide plate 15 from its light incidence surface 15c. Similarly, the second light beam L22 emitted from the second light source 201 enters the surface emitting light guide plate 15 from its light incidence surface 15c. The first light beam L21 is emitted from the first light source 18 toward the light incidence surface 15c substantially in the +x-axis direction (toward the right in FIG. 9). The beam axis of the first light beam L21 is now approximately parallel to the reference plane (xy plane in FIG. 9) of the surface emitting light guide plate 15.

The second light beam L22 propagates in the angular intensity distribution shaping member 210, is reflected by the reflecting surface 202a of the cylindrical mirror 202, and exits toward the light incidence surface 15c of the surface emitting light guide plate 15. The cylindrical mirror 202 has the following two functions here. Its first function, viewed in the zx plane, is to tilt the beam axis of the second light beam L22 at an arbitrary angle with respect to the reference plane of the surface emitting light guide plate 15. The reference plane is the xy plane in FIG. 9. The second function is to change the shape of the angular intensity distribution of the second light beam L22, viewed in the zx plane, to an arbitrary shape. The zx plane is perpendicular to the reference plane of the surface emitting light guide plate 15. A plane parallel to the zx plane will be referred to below as a plane in the thickness direction of the surface emitting light guide plate 15. Here, the axis of the principal ray is the axis of a ray directed in the angular direction of a weighted mean of the angular intensity distribution in an arbitrary plane.

After being reflected by the cylindrical mirror 202, the second light beam L22 enters the surface emitting light guide plate 15. Viewed in the zx plane, the beam axis of the second light beam L22 is inclined at an arbitrary angle with respect to the reference plane of the surface emitting light guide plate 15. The second light beam L22 retains this angle as it propagates in the mixing region 15e in the +x-axis direction.

Viewed in the zx plane, the second light beam L22 propagates by reflection from the front surface 15a and back surface 15b of the mixing region 15e. While propagating, the second light beam L22 now diverges at its own divergence angle. Accordingly, viewed in the zx plane, the front surface 15a and back surface 15b of the surface emitting light guide plate 15 fold the second light beam L22. The folded second light beam L22 folds onto itself. The light flux of the second light beam L22 becomes a flux having a diameter equal to the thickness of the surface emitting light guide plate 15.

This causes the angular intensity distribution in the zx plane of the second light beam L22 exiting from the mixing region 15e into region 15f to have a distribution shape that additively combines the angular intensity distribution of the second light beam L22 when it enters the mixing region 15e and the symmetric reflection of this distribution with respect to the reference plane of the surface emitting light guide plate 15.

The first light beam L21 emitted from the first light source 18 enters the surface emitting light guide plate 15 without changing its angular intensity distribution. Just after entering the surface emitting light guide plate 15, the first light beam L21 has a wide angular intensity distribution. The second light beam L22 emitted from the second light source 201 has a narrower angular intensity distribution than the first light beam L21. If both a first light beam L21 having a wide angular intensity distribution and a second light beam L22 having a narrow angular intensity distribution were to enter the surface emitting light guide plate 15, the difference between the angular intensity distributions of the two light beams L21, L22 of different types would increase in the surface emitting light guide plate 15.

By means of the angular intensity distribution shaping member 210, however, the surface light source device 200 in the second embodiment can give the angular intensity distribution of the second light beam L22 viewed in the xy plane substantially the same shape as the angular intensity distribution of the first light beam L21. The surface light source device 200 in the second embodiment can also give the angular intensity distribution of the second light beam L22 viewed in the zx plane substantially the same shape as the angular intensity distribution of the first light beam L21 by means of the cylindrical mirror 202 and the mixing region 15*e*.

The first light beam L21 emitted from the first light source 18 is, for example, a blue-green light beam. The second light beam L22 emitted from the second light source 201 is, for example, a red light beam. The first light beam L21 enters the surface emitting light guide plate 15 from its light incidence surface 15*c*. The second light beam L22 enters the surface emitting light guide plate 15 from its light incidence surface 15*c*. The function of the mixing region 15*e* is to mix the first light beam L21 and the second light beam L22. The two light beams L21, L22 of different types are mixed together while they propagate in the mixing region 15*e*, and become a mixed light beam L23. The mixed light beam L23 is, for example, a white light beam. The mixing region 15*e* is disposed in the vicinity of the light incidence surface 15*c*.

The mixed light beam L23 is converted to illumination light L24 by the optical microelements 16 disposed on the back surface 15*b* of the surface emitting light guide plate 15. The illumination light L24 travels substantially in the +z-axis direction toward the back surface 11*b* of the liquid crystal panel 11. The illumination light L24 passes through the second optical sheet 13 and the first optical sheet 12 and illuminates the back surface 11*b* of the liquid crystal panel 11. The function of the first optical sheet 12 is to direct the illumination light L24 exiting the front surface 15*a* of the surface emitting light guide plate 15 toward the back surface 11*b* of the liquid crystal panel 11. The function of the second optical sheet 13 is to suppress optical effects such as minute illumination irregularities due to the illumination light L24.

The light reflecting sheet 17 is disposed facing the back surface 15*b* of the surface emitting light guide plate 15. Of the light in the mixed light beam L23, light exiting the back surface 15*b* of the surface emitting light guide plate 15 is reflected by the light reflecting sheet 17 and travels toward the back surface 15*b* of the surface emitting light guide plate 15. That light then passes through the surface emitting light guide plate 15 and exits from its front surface 15*a* toward the back surface 11*b* of the liquid crystal panel 11 as illumination light L24. Of the light rays in the mixed light beam L23, the light rays encountering the optical microelements 16 also exit as illumination light L24.

Although the inclined surface 211*b* of the angular intensity distribution shaping member 210 is inclined by an angle of about 45 degrees with respect to the xy plane in the description given above, the present invention is not limited to this angle. The angle of incidence of the second light beam L22 on the inclined surface 211*b* is set by the total reflection condition. The total reflection condition is obtained from the critical angle θt and the half angle of the angular intensity distribution of the second light beam L22.

To optimize the light path of the second light beam L22, the angle of inclination of the inclined surface 211*b* may be changed in accordance with the positional relationships among components such as the light exit surface 211*c*, cylindrical mirror 202, surface emitting light guide plate 15, and inclined surface 211*b*. Alternatively, the location and shape of the cylindrical mirror 202 may be changed to optimize the light path of the second light beam L22, instead of changing the angle of inclination of the inclined surface 211*b*.

The adjustment of the angle of inclination of the inclined surface 211*b* or the location of the cylindrical mirror 202 is carried out for the following three purposes. The first purpose is to couple the second light beam L22 efficiently into the cylindrical mirror 202 and surface emitting light guide plate 15. The second purpose is to tilt the beam axis that the second light beam L22 has just after entering the surface emitting light guide plate 15 so that it is at an arbitrary angle to the reference plane of the surface emitting light guide plate 15, as viewed in the zx plane. The third purpose is to provide the second light beam L22, just after it enters the surface emitting light guide plate 15, with an arbitrary angular intensity distribution, as viewed in the zx plane.

The positional and other relationships between the second light source 201 and the cylindrical mirror 202 are set according to the angular intensity distribution of the second light beam L22, the size (diameter) of the light flux of the second light beam L22, the curvature of the cylindrical mirror 202, the thickness of the surface emitting light guide plate 15, and so on. The positional and other relationships between the cylindrical mirror 202 and the surface emitting light guide plate 15 are set according to the angular intensity distribution of the second light beam L22, the size (diameter) of the light flux of the second light beam L22, the curvature of the cylindrical mirror 202, the thickness of the surface emitting light guide plate 15, and so on. Accordingly, the positional and other relationships among the members must be optimized when a condition changes. 'Positional and other relationships' means the relationships among components which determine the light path of the light beam, such as the locations of the components and the inclinations of their reflecting surfaces.

In FIG. 9, the angular intensity distribution shaping member 210 is disposed parallel to the surface emitting light guide plate 15. The second light beam L22 exits the second light source 201 in a direction parallel to the surface emitting light guide plate 15. However, the present invention is not limited to this configuration.

Figure 12:
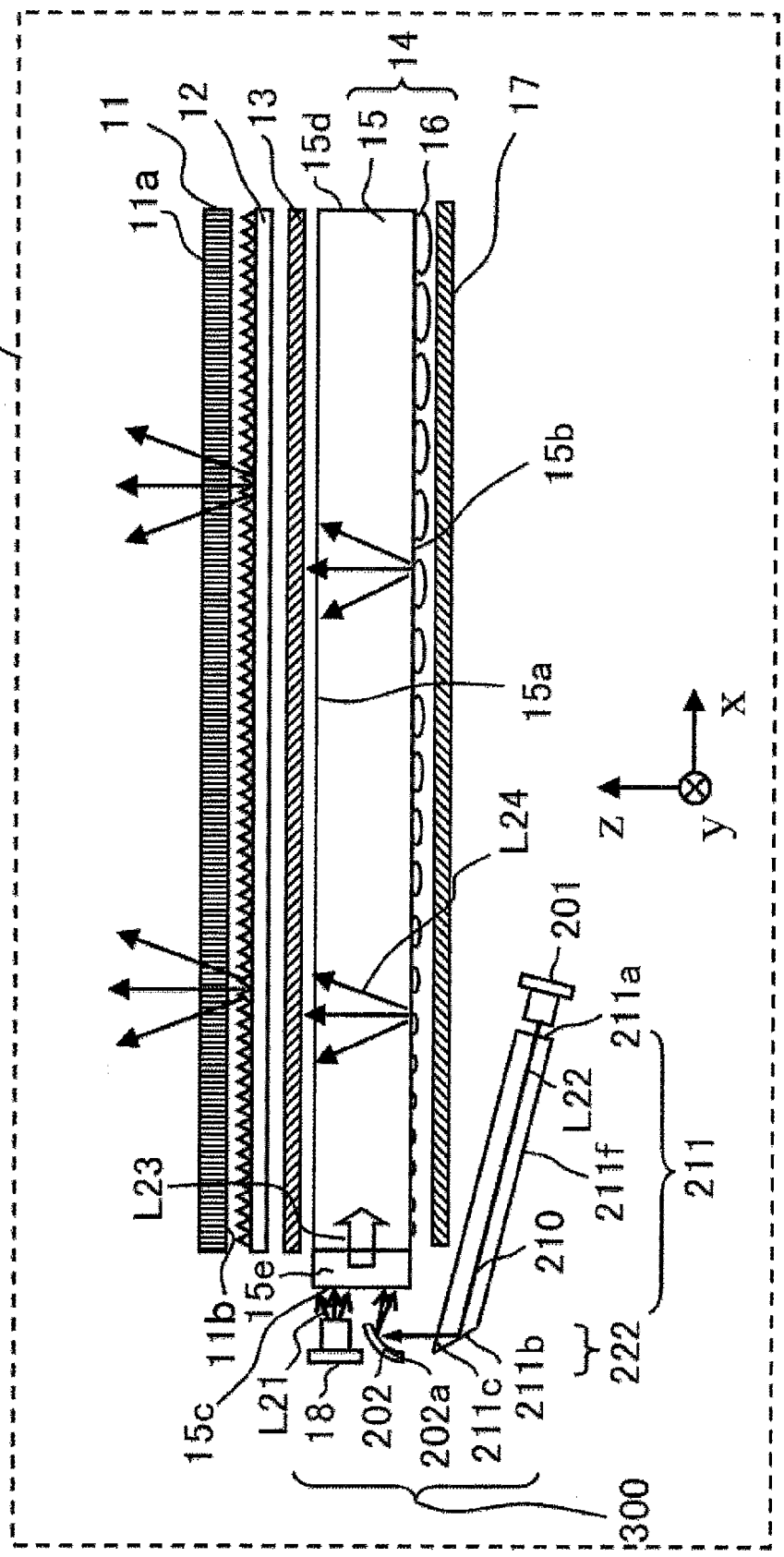
FIG. 12 is a diagram showing the structure of a liquid crystal display device according to the second embodiment.

In the surface light source device 300 shown in FIG. 12, for example, the light incidence surface 211*a* of the angular intensity distribution shaping member 210 is positioned at a distance from the light reflecting sheet 17. That is, the angular intensity distribution shaping member 210 is tilted away from the xy plane. The exit surface 211*c* of the angular intensity distribution shaping member 210 can then be disposed in the vicinity of the cylindrical mirror 202 even if the second light source 201 and its peripheral members are large. This makes it possible to mitigate the light loss that may occur in the interval until the second light beam L22 that has left the exit surface 211*c* reaches the cylindrical mirror 202. The peripheral members of the second light source 201 are, for example, its fixture members and the like.

When the angular intensity distribution shaping member 210 is tilted at an angle with respect to the surface emitting light guide plate 15, the second light source 201 is positioned in such a way that the beam axis of the second light beam L22 parallels the light exit surface 211*c* and surface 211*f*. This makes it easy to control the light reflection angle in the light folding section 222. It will be appreciated that the second light source 201 is disposed facing the light incidence surface 211a of the angular intensity distribution shaping member 210.

The angle of inclination of the inclined surface 211b is determined by consideration of the following three requirements. The first requirement is the direction of the beam axis of the second light beam L22 exiting the light folding section 222, with respect to the direction of the beam axis of the second light beam L22 entering the light folding section 222. The second requirement is the direction of the beam axis of the second light beam L22 exiting the cylindrical mirror 202, with respect to the direction of the beam axis of the second light beam L22 entering the cylindrical mirror 202. The third requirement is that the second light beam L22 incident on the inclined surface 211b must satisfy the condition for total reflection at the inclined surface 211b. By specifying an angle between the beam axis of the second light beam L22 and the inclined surface 211b that satisfies these three requirements, light loss at the inclined surface 211b can be suppressed.

Making the angular intensity distribution shaping member 210 in the second embodiment thinner can lead to a reduction in the size of the cylindrical mirror 202. The reason is that the thickness of the line of light exiting the inclined surface 211b is reduced. Making the angular intensity distribution shaping member 210 thinner can also lead to a reduction in the thickness of the surface emitting light guide plate 15. The reason is that the dimension of the cylindrical mirror 202 in the z-axis direction is reduced. Accordingly, use of a thin angular intensity distribution shaping member 210 is preferred. However, since the reduced thickness decreases the rigidity of the angular intensity distribution shaping member 210, the thickness reduction is preferably kept within a range such that the rigidity of the angular intensity distribution shaping member 210 does not become too low.

While the second light beam L22 that exits the angular intensity distribution shaping member 210 toward the cylindrical mirror 202 is travelling in the angular intensity distribution shaping member 210, it becomes a line of light having a light flux diameter equal to the thickness of the angular intensity distribution shaping member 210 in the zx plane.

The second light beam L22 travels in the angular intensity distribution shaping member 210 in the −x-axis direction by reflection between two surfaces, the light exit surface 211c and surface 211f. Surface 211f faces the light exit surface 211c. The light exit surface 211c is parallel to surface 211f. The beam axis of the second light beam L22 is parallel to these two surfaces, the light exit surface 211c and surface 211f.

The second light beam L22 exiting the light exit surface 211c is therefore a light beam having substantially the same angular intensity distribution as the angular intensity distribution it had just after exiting the second light source 201. The second light beam L22 exiting the light exit surface 211c can be regarded as a secondary light source that exits the angular intensity distribution shaping member 210.

The cross section of the reflecting surface 202a of the cylindrical mirror 202 in the zx plane has a concave circular arc shape. This being the case, the angles between tangents to the circular arc shape of the reflecting surface 202a and the rays constituting the light flux of the second light beam L22 take a range of values. That is, the reflecting surface 202a has the effect of spreading the parallel light. Accordingly, the surface light source devices 200 and 300 in the second embodiment can widen the full angle of the angular intensity distribution of the second light beam L22 by means of the cylindrical mirror 202.

The separated angular intensity distribution shaping members 210a, 210b, 210c in the second embodiment are also effective during local lighting control, which will be described below in the third embodiment. The angular intensity distribution of the second light beam L22 viewed in the xy plane can be finely adjusted by the angular intensity distribution shaping member 210. Accordingly, planar brightness irregularity and color irregularity in the planer illumination light L24 can be suppressed during local lighting control.

Third Embodiment

Figure 13:
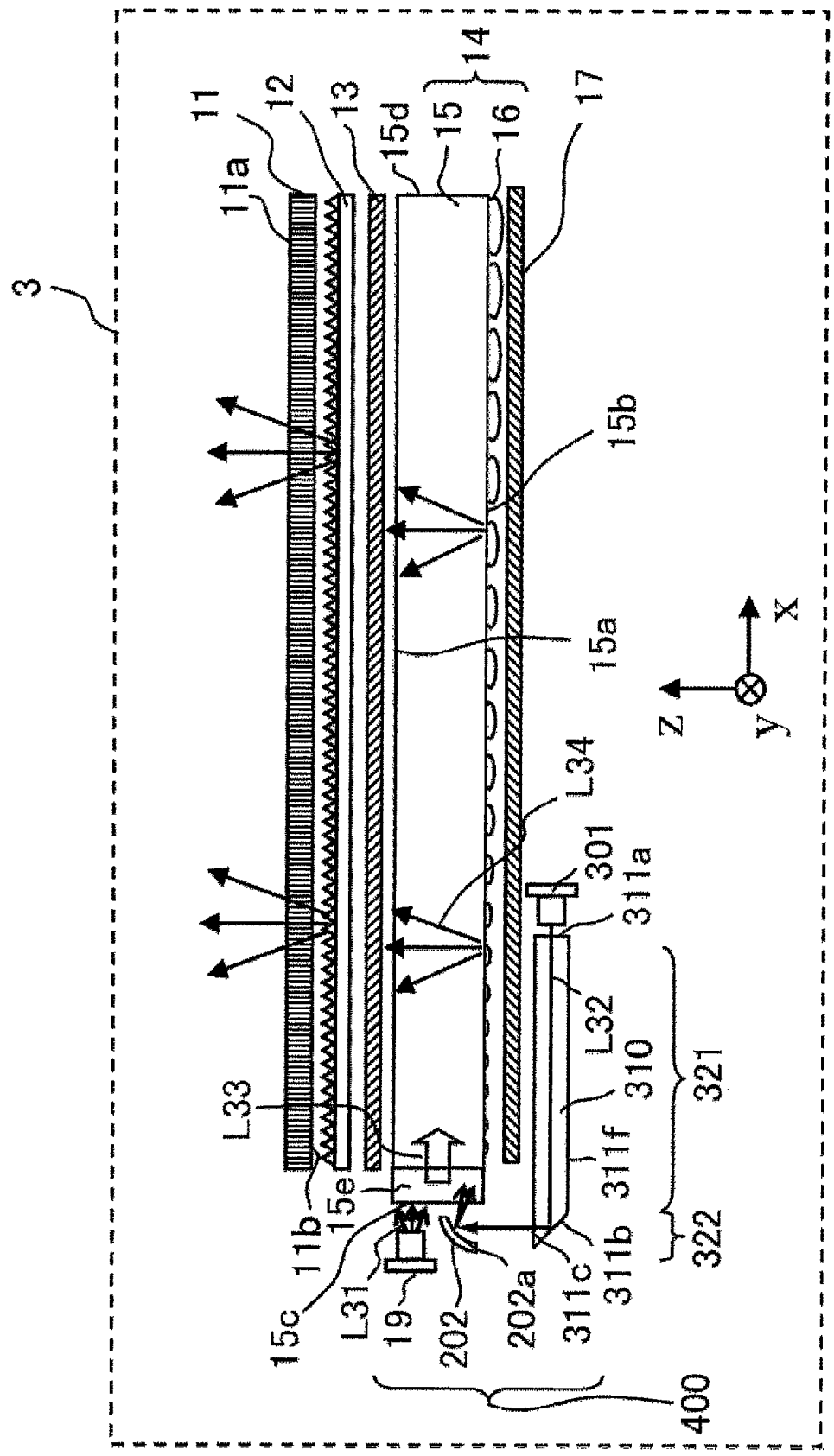
FIG. 13 is a diagram showing the structure of a liquid crystal display device according to a third embodiment.

FIG. 13 is a diagram schematically showing the structure of a liquid crystal display device 3 (including a surface light source device 400) according to a third embodiment. The surface light source device 400 according to the third embodiment includes, instead of the angular intensity distribution shaping member 210 in the second embodiment, an angular intensity distribution shaping member 310 of a different shape. Components identical to components shown in FIG. 1 in the first embodiment or FIG. 9 in the second embodiment will be denoted by the same reference characters, and descriptions of those components will be omitted. Of the components of the third embodiment shown in FIG. 13, the identical components are the liquid crystal panel 11, optical sheets 12, 13, surface emitting light guide plate 15, optical microelements 16, light reflecting sheet 17, first light source 18, and cylindrical mirror 202.

Figure 14:
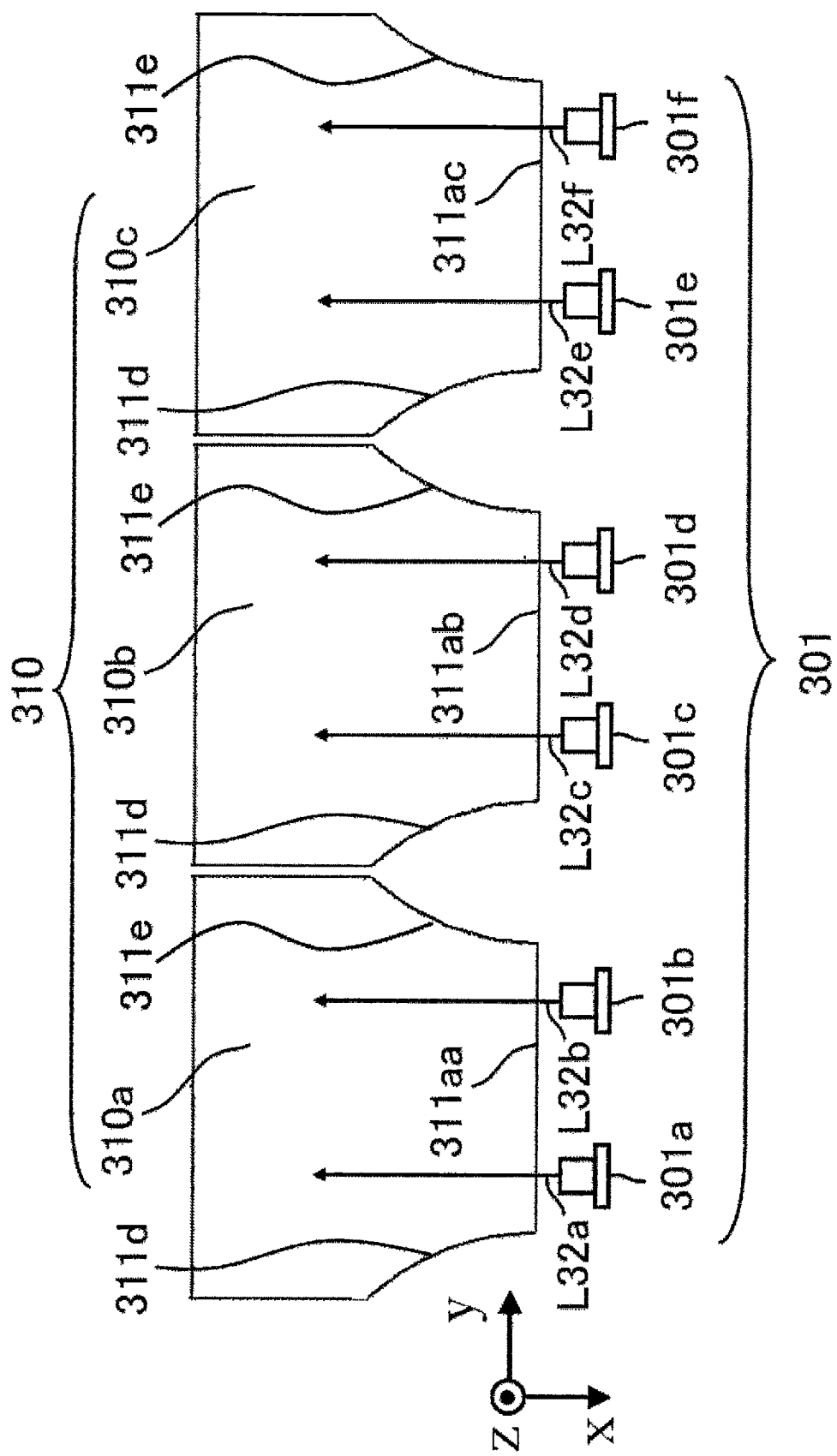
FIG. 14 is a diagram showing the structure of the angular intensity distribution shaping member in the surface light source device according to the third embodiment.
Figure 15:
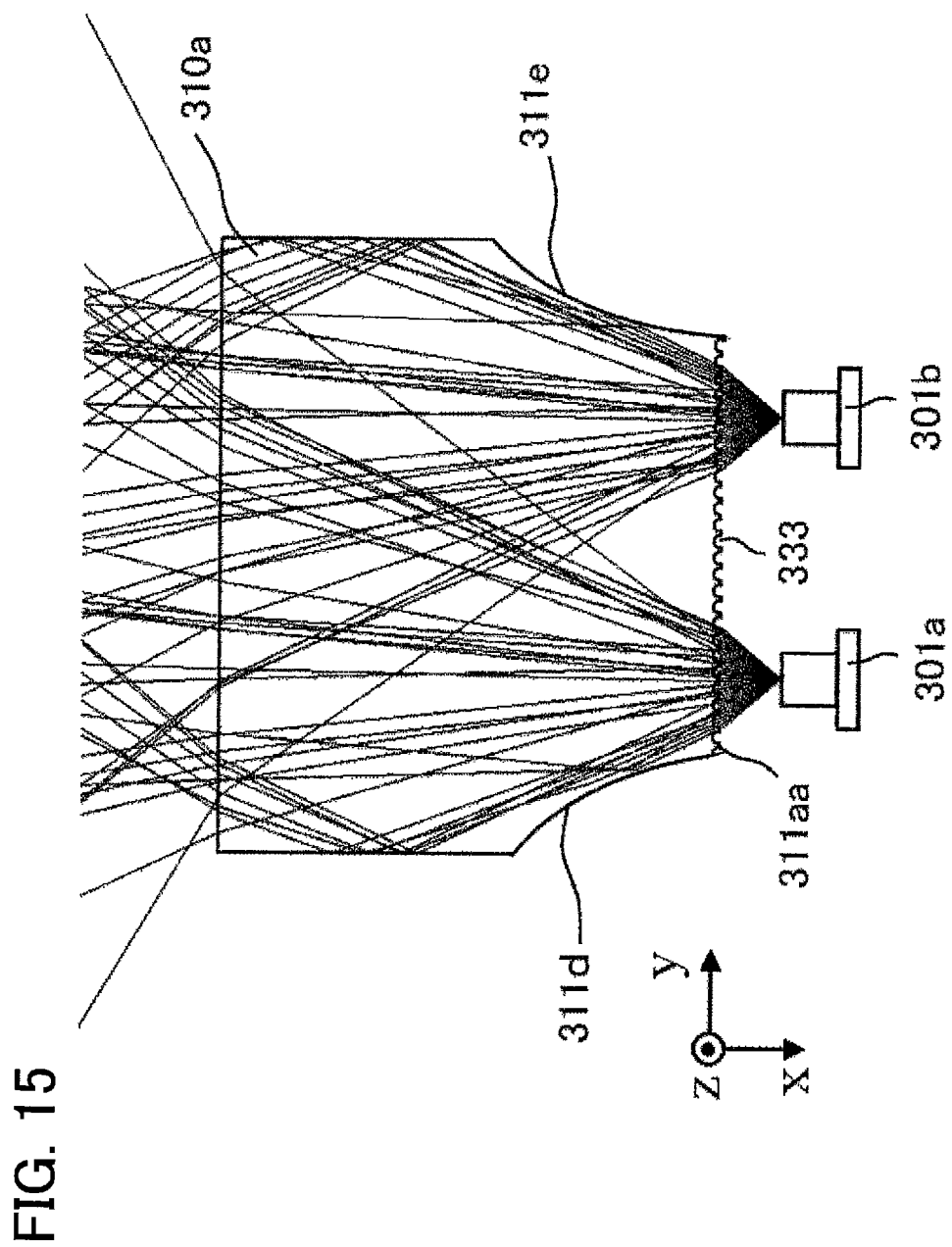
FIG. 15 is a diagram showing the structure of the angular intensity distribution shaping member in the surface light source device according to the third embodiment.

FIG. 14 is a diagram showing the structure of the angular intensity distribution shaping member 310 in the third embodiment, viewed from the +z-axis direction. As shown in FIG. 14, the angular intensity distribution shaping member 310 includes three angular intensity distribution shaping members 310a, 310b, 310c aligned in the y-axis direction. The angular intensity distribution shaping members 310a, 310b, 310c have identical shapes. FIG. 15 is a diagram showing the structure of angular intensity distribution shaping member 310a, viewed from the +z-axis direction.

Recently, technology that combines local lighting control of a backlight with the image has been widely deployed for the purposes of reducing the power consumption of liquid crystal display devices and improving their stereoscopic display performance. Local lighting control of a backlight consists in turning on the planar light emitted from a surface light source included in the liquid crystal display device in only parts of the plane. In a side lit device, the light sources disposed facing the side of the light guide plate are divided into several groups, and the lighting of each group is controlled. This changes the planar brightness distribution of the illumination light exiting the surface emitting light guide plate.

If local lighting control turns on only some of the light sources to make the planar illumination light illuminate the xy plane locally, the angular intensity distributions of the light beams entering the surface emitting light guide plate are approximately projected into the planar brightness distribution of the illumination light. More specifically, the planar brightness distribution of the illumination light spreads in the xy plane from the light incidence surface toward the side opposite the light incidence surface at angles substantially equal to the angles of the angular intensity distributions of the light beams. The light incidence surface is a side of the surface emitting light guide plate 15 facing the light sources that are turned on. Accordingly, if there is only one type of light beam, then during local lighting control, the illumination light has brightness irregularities in the xy plane. If there is a difference in angular intensity distribution between two types of light beams with different colors, then during local lighting control, the illumination light has color irregularities in the xy plane.

In the surface light source device 400 in the third embodiment, however, the angular intensity distribution shaping member 310 has adjustment surfaces 311d, 311e. With the angular intensity distribution shaping member 310, the surface light source device 400 in the third embodiment can very finely adjust the angular intensity distribution, viewed in the xy plane, of the second light beam L32. Accordingly, planar brightness irregularity and color irregularity in the planar illumination light L34 can be suppressed during local lighting control.

In the surface light source device 400 in the third embodiment, the angular intensity distribution shaping member 310 can fashion the angular intensity distribution of the second light beam L32 viewed in the xy plane into almost the same shape as the angular intensity distribution of the first light beam L31. In particular, the angular intensity distribution shaping member 310 in the surface light source device 400 in the third embodiment has adjustment surfaces 311d, 311e. These surfaces make it possible to adjust the angular intensity distribution of the light beam L32 in the xy plane very finely and make it approximate the angular intensity distribution of the light beam L31. Accordingly, planar color irregularities in the planar illumination light L34 can be suppressed during local lighting control. 'Planar color irregularities' are color irregularities in positions expressed in an arbitrary two-dimensional plane. In the third embodiment, the arbitrary plane is the xy plane.

The angular intensity distribution shaping member 310 is disposed parallel to the xy plane. The angular intensity distribution shaping member 310 is a plate member. For example, the angular intensity distribution shaping member 310 is a plate member having a thickness of 1 mm. Its dimensions are 70 mm in the x-axis direction and 85 mm in the y-axis direction. The angular intensity distribution shaping member 310 is made of a transparent acrylic resin such as PMMA.

As shown in FIG. 14, the light incidence surface 311aa of angular intensity distribution shaping member 310a faces laser emission elements 301a, 301b. A second light beam L32a is emitted from laser emission element 301a. A second light beam L32b is emitted from laser emission element 301b. The beam axis of second light beam L32a is approximately parallel to the x-axis. The beam axis of second light beam L32b is approximately parallel to the x-axis.

The light incidence surface 311ab of angular intensity distribution shaping member 310b faces laser emission elements 3101c, 301d. A second light beam L32c is emitted from laser emission element 301c. A second light beam L32d is emitted from laser emission element 301d. The beam axis of second light beam L32c is approximately parallel to the x-axis. The beam axis of second light beam L32d is approximately parallel to the x-axis.

The light incidence surface 311ac of angular intensity distribution shaping member 310c faces laser emission elements 301e, 301f. A second light beam L32e is emitted from laser emission element 301e. A second light beam L32f is emitted from laser emission element 301f. The beam axis of second light beam L32e is approximately parallel to the x-axis. The beam axis of second light beam L32f is approximately parallel to the x-axis.

The beam axis here is an axis whose angular direction is a weighted mean of the angular intensity distribution of the light beam in an arbitrary plane. The weighted mean angle can be found by taking a mean of angles weighted according to their light intensity. If the position of peak light intensity is not centered in the angular intensity distribution, the beam axis angle is not at the position of peak light intensity. The beam axis angle is at the position of the areal centroid of the angular intensity distribution.

FIG. 15 is a diagram showing the structure of angular intensity distribution shaping member 310a. As shown in FIG. 15, angular intensity distribution shaping member 310a has an optical microstructure 333 on its light incidence surface 311aa. The optical microstructure 333 operates to change the direction of travel of incident light by refraction. In the optical microstructure 333, for example, cylindrical side shapes are formed as concave shapes in light incidence surface 311a, as shown in FIG. 15. The concave shapes of the optical microstructure 333 are formed at regular intervals in the y-axis direction. The central axes of the cylinders here are parallel to the z-axis. The concave shapes shown in FIG. 15 are side shapes cut in a plane parallel to a plane passing through the central axes of the cylinders. A cross section of the optical microstructure 333 cut in the xy plane has circular arc shapes that are concave on the side toward the laser emission elements 301a, 301b. A cross section of the light incidence surface 311aa cut in the zx plane would have a linear shape extending in the z-axis direction. Angular intensity distribution shaping members 310b, 310c have the same shape as angular intensity distribution shaping member 310a.

In the xy plane, the optical microstructure 333 of the angular intensity distribution shaping member 310 in the third embodiment has concave circular arc shapes with a radius of 40 μm. The circular arc shapes are centered on a plane parallel to the light incidence surfaces 311aa, 311ab, 3110ac. The depth of the concave shapes is 20 μm. The spacing of the circular arc shapes is 80 μm, which is the distance between the centers of the circular arcs.

The second light beam L32 entering the light incidence surface 311a is diffused by the optical microstructure 333 when it enters the light incidence surface 311a. Therefore, the full angle of the angular intensity distribution of the second light beam L32 entering the angular intensity distribution shaping member 310 is larger than the full angle of the angular intensity distribution just after emission from the second light source 301. The second light beam L32 travels in random directions. Angular intensity distribution shaping member 310 represents angular intensity distribution shaping member 310a, angular intensity distribution shaping member 310b, and angular intensity distribution shaping member 310c collectively. Light incidence surface 311a represents light incidence surface 311aa, light incidence surface 311ab, and light incidence surface 311ac collectively. Second light beam L32 represents second light beam L32a, second light beam L32b, second light beam L32c, second light beam L32d, second light beam L32e, and second light beam L32f collectively.

The second light beam L32 emitted from the second light source 301 has a narrow angular intensity distribution with a full angle of 35 degrees in the xy plane. The angular intensity distribution is substantially a Gaussian distribution. Second light beam L32a is additively combined with second light beam L32b in angular intensity distribution shaping member 310a. Second light beam L32a is emitted from laser emission element 301a. Second light beam L32b is emitted from laser emission element 301b. Both second light beam L32a and second light beam L32b enter angular intensity distribution shaping member 310a.

Second light beam L32c is additively combined with second light beam L32d in angular intensity distribution shaping member 310b. Second light beam L32c is emitted from laser emission element 301c. Second light beam L32d is emitted from laser emission element 301d. Both second light beam L32c and second light beam L32d enter angular intensity distribution shaping member 310b.

Second light beam L32e is additively combined with second light beam L32f in angular intensity distribution shaping member 310c. Second light beam L32e is emitted from laser emission element 301e. Second light beam L32f is emitted from laser emission element 301f. Both second light beam L32e and second light beam L32f enter angular intensity distribution shaping member 310c.

As shown in FIG. 15, angular intensity distribution shaping member 310a has adjustment surfaces 311d, 312e on its side surfaces in the y-axis direction for adjusting the angular intensity distribution. Adjustment surfaces 311d, 312e have a concave circular arc shape in the xy plane. Cross sections cut in the yz plane would have linear shapes extending in the z-axis direction. Since angular intensity distribution shaping members 310b, 310c have the same shape as angular intensity distribution shaping member 310a, they also have adjustment surfaces 311d, 311e.

In angular intensity distribution shaping member 310a, adjustment surface 312d is formed in the side surface located in the −y-axis direction from laser emission element 301a. Of the light flux of second light beam L32a, rays emitted in the −y-axis direction are reflected by adjustment surface 311d. Adjustment surface 312e is formed in the side surface located in the +y-axis direction from laser emission element 301b. Of the light flux of second light beam L32b, light rays emitted in the +y-axis direction are reflected by adjustment surface 311e.

Without adjustment surfaces 311d, 311e, these light rays would belong to the peripheral part of the light flux obtained by additively combining second light beams L32a and L32b. These light rays would become peripheral rays in the angular intensity distribution at the light exit surface 311c of angular intensity distribution shaping member 310a. These light rays change their directions of travel by reflection from adjustment surfaces 311d, 311e. The directions of travel of the light beams L32a, L32b incident on adjustment surfaces 311d, 312e can be adjusted by adjusting their angles of incidence. That is, the shape of the angular intensity distribution of the light beam obtained by additively combining second light beams L32a and L32b can be adjusted by changing the shapes of the adjustment surfaces 311d, 311e. The light beam obtained by additively combining the second light beams L32a, L32b is the light beam that exits the light exit surface 311c. 'These light rays' are light rays of the light flux of second light beam L32a that are emitted in the −y-axis direction and light rays of the light flux of second light beam L32b that are emitted in the +y-axis direction.

In angular intensity distribution shaping member 310b, adjustment surface 312d is formed in the side surface located in the −y-axis direction from laser emission element 301c. Of the light flux of second light beam L32c, light rays emitted in the −y-axis direction are reflected by adjustment surface 311d. Adjustment surface 312e is formed in the side surface located in the +y-axis direction from laser emission element 301d. Of the light flux of second light beam L32d, light rays emitted in the +y-axis direction are reflected by adjustment surface 311e.

Without adjustment surfaces 311d, 311e, these light rays would belong to the peripheral part of the light flux obtained by additively combining second light beams L32c and L32d. These light rays would become peripheral rays in the angular intensity distribution at the light exit surface 311c of angular intensity distribution shaping member 310b. These light rays change their directions of travel by reflection from adjustment surfaces 311d, 311e. The directions of travel of the light beams L32c, L32d incident on adjustment surfaces 311d, 312e can be adjusted by adjusting their angles of incidence. That is, the shape of the angular intensity distribution of the light beam obtained by additively combining second light beams L32c and L32d can be adjusted by changing the shapes of adjustment surfaces 311d, 311e. The light beam obtained by additively combining the second light beams L32c, L32d is the light beam that exits the light exit surface 311c. 'These light rays' are light rays of the light flux of second light beam L32c that are emitted in the −y-axis direction and light rays of the light flux of second light beam L32d that are emitted in the +y-axis direction.

In angular intensity distribution shaping member 310c, adjustment surface 312d is formed in the side surface located in the −y-axis direction from laser emission element 301e. Of the light flux of second light beam L32e, light rays emitted in the −y-axis direction are reflected by adjustment surface 311d. Adjustment surface 312e is formed in the side surface located in the +y-axis direction from laser emission element 301f. Of the light flux of second light beam L32f, light rays emitted in the +y-axis direction are reflected by adjustment surface 311e.

Without adjustment surfaces 311d, 311e, these light rays would belong to the peripheral part of the light flux obtained by additively combining second light beams L32e and L32f. These light rays would become peripheral rays in the angular intensity distribution at the light exit surface 311c of angular intensity distribution shaping member 310c. These light rays change their directions of travel by reflection from adjustment surfaces 311d, 311e. The directions of travel of the light beams L32e, L32f incident on adjustment surfaces 311d, 312e can be adjusted by adjusting their angles of incidence. That is, the shape of the angular intensity distribution of the light beam obtained by additively combining second light beams L32e and L32f can be adjusted by changing the shapes of the adjustment surfaces 311d, 311e. The light beam obtained by additively combining the second light beams L32e, L32f is the light beam that exits the light exit surface 311c. 'These light rays' are light rays in the light flux of second light beam L32e that are emitted in the −y-axis direction and light rays in the light flux of second light beam L32f that are emitted in the +y-axis direction.

The adjustment surfaces 311d, 312e of the angular intensity distribution shaping member 310 in the third embodiment have a concave circular arc shape, as described above. Adjustment surfaces 312d can redirect light rays on the −y-axis side in second light beams L32a, L32c, L32e toward the +y-axis direction. Adjustment surfaces 312e can redirect light rays on the +y-axis side in second light beams L32b, L32d, L32f toward the −y-axis direction. As a result, the directions of travel of light rays that would become peripheral light rays of the light beam obtained by additively combining second light beams L32a and L32b if the adjustment surfaces 311d, 312e were not provided can be brought closer to the vicinity of the angular center. The directions of travel of light rays that would become peripheral light rays of the light beam obtained by additively combining second light beams L32c and L32d can be brought closer to the vicinity of the angular center. The directions of travel of light rays that would become peripheral light rays of the light beam obtained by additively combining second light beams L32e and L32f can be brought closer to the vicinity of the angular center.

The adjustment surfaces 311d, 312e of the angular intensity distribution shaping member 310 in the third embodiment have a concave circular arc shape. However, the present invention is not limited that shape. For example, the adjustment surfaces 311d, 312e may have a convex circular arc shape or a linear shape. They may also have an array of concave circular arc shapes. The shapes of the adjustment surfaces 311d, 312e can be changed to shape the angular intensity distribution of the second light beam L32 as required.

The angular intensity distribution shaping member 310 in the third embodiment includes three angular intensity distribution shaping members 310a, 310b, 310c. Angular intensity distribution shaping members 310b, 310c have the same shapes and functions as angular intensity distribution shaping member 310a.

The angular intensity distribution shaping member 310 in the third embodiment includes three angular intensity distribution shaping members 310a, 310b, 310c, but the present invention is not limited to a three-piece structure. The number of pieces may be increased, provided they are disposed in the longitudinal direction (y-axis direction) of the light incidence surface 15c of the surface emitting light guide plate 15. The number of angular intensity distribution shaping members 310 also increases or decreases depending on factors such as the number of laser emission elements included in the second light source 301.

The angular intensity distribution of the second light beam L32 emitted from the second light source 301 is adjusted in the xy plane when it passes through the angular intensity distribution shaping member 310. The angular intensity distribution of the second light beam L32 exiting the light exit surface 311c can be shaped as required by optimizing the shapes of the adjustment surfaces 311d, 311e of the angular intensity distribution shaping member 310. The light exit surface 311c is the light exit surface of the angular intensity distribution shaping member 310.

The shapes of the adjustment surfaces 311d, 312e of the angular intensity distribution shaping member 310 in the third embodiment are optimized so that the angular intensity distribution of the second light beam L32 just after entering the surface emitting light guide plate 15 substantially approximates the angular intensity distribution of the first light beam L31 just after it enters the surface emitting light guide plate 15.

As shown in FIG. 13, the angular intensity distribution shaping member 310 has a light incidence surface 311a, an inclined surface 311b, and a light exit surface 311c. The light exit surface 311c faces the reflecting surface 202a of the cylindrical mirror 202. The inclined surface 311b is tilted at an angle of about 45 degrees with respect to the xy plane. The inclined surface 311b changes the direction of travel of the second light beam L32 from the −x-axis direction to substantially the +z-axis direction. That is, the second light beam L32 is reflected by the inclined surface 311b and changes its direction of travel to substantially the +z-axis direction. Reflection of the second light beam L32 occurs because of the difference in refractive index at the interface between the angular intensity distribution shaping member 310 and the layer of air.

The behavior of the second light beam L32 viewed in the zx plane will now be described. The second light beam L32 is emitted from the second light source 301. The second light beam L32 enters the angular intensity distribution shaping member 310 from the light incidence surface 311a of the angular intensity distribution shaping member 310. The second light beam L32 is totally reflected by the interface between the angular intensity distribution shaping member 310 and the air layer and travels in the −x-axis direction in the angular intensity distribution shaping member 310. When the second light beam L32 reaches the inclined surface 311b, it is reflected by the inclined surface 311b and changes its direction of travel to substantially the +z-axis direction. After changing its direction of travel and exiting through the light exit surface 311c, the second light beam L32 is reflected by the cylindrical mirror 202 and enters the surface emitting light guide plate 15 from its light incidence surface 15c. The cylindrical mirror 202 functions as a light-path changing member.

Viewed in the zx plane, the second light beam L32 traveling in the angular intensity distribution shaping member 310 travels in the −x-axis direction by total reflection from the light exit surface 311c and the surface 311f opposite the light exit surface 311c. The light exit surface 311c and the opposite surface 311f are parallel. The beam axis of the second light beam L32 is parallel to those surfaces. Accordingly, the angular intensity distribution of the second light beam L32 propagating in the angular intensity distribution shaping member 310 is preserved. This means that the angular intensity distribution in the zx plane of the second light beam L32 exiting the light exit surface 311c is the same as the angular intensity distribution in the zx plane of the second light beam L32 just after emission from the second light source 301. After exiting the light exit surface 311c, the second light beam L32 strikes the cylindrical mirror 202, is reflected by the reflecting surface 302a, and redirects its direction of travel toward the light incidence surface 15c of the surface emitting light guide plate 15 (roughly in the +x-axis direction).

The first light beam L31 emitted from the first light source 19 enters the surface emitting light guide plate 15 from its light incidence surface 15c. Similarly, the second light beam L32 emitted from the second light source 301 enters the surface emitting light guide plate 15 from its light incidence surface 15c. The first light beam L31 is emitted from the first light source 19 toward the light incidence surface 15c substantially in the +x-axis direction (toward the right in FIG. 13). The beam axis of the first light beam L31 is now approximately parallel to the reference plane (xy plane in FIG. 13) of the surface emitting light guide plate 15.

The second light beam L32 propagates in the angular intensity distribution shaping member 310 and is reflected by the reflecting surface 202a of the cylindrical mirror 202. The second light beam L32 then travels toward the light incidence surface 15c of the surface emitting light guide plate 15. The cylindrical mirror 202 has the following two functions here. Its first function, viewed in the zx plane, is to tilt the beam axis of the second light beam L32 at an arbitrary angle with respect to the reference plane of the surface emitting light guide plate 15. The reference plane is the xy plane in FIG. 13. The second function is to change the shape of the angular intensity distribution of the second light beam L32, viewed in the zx plane, to an arbitrary shape. The zx plane is perpendicular to the reference plane of the surface emitting light guide plate 15. A plane parallel to the zx plane will be referred to below as a plane in the thickness direction of the surface emitting light guide plate 15. Here, the axis of the principal ray is the axis of a ray directed in the angular direction of a weighted mean of the angular intensity distribution in an arbitrary plane.

After being reflected by the cylindrical mirror 202, the second light beam L32 enters the surface emitting light guide plate 15. Viewed in the zx plane, the beam axis of the second light beam L32 is inclined at an arbitrary angle with respect to the reference plane of the surface emitting light guide plate 15. The second light beam L32 retains this angle as it propagates in the mixing region 15e in the +x-axis direction.

Viewed in the zx plane, the second light beam L32 propagates by reflection from the front surface 15a and back surface 15b of the mixing region 15e. While propagating, the second light beam L22 now diverges at its own divergence angle. Accordingly, viewed in the zx plane, the front surface 15a and back surface 15b of the surface emitting light guide plate 15 fold the second light beam L32. The folded second light beam L32 folds onto itself. The light flux of the second light beam L32 becomes a flux having a diameter equal to the thickness of the surface emitting light guide plate 15.

This causes the angular intensity distribution in the zx plane of the second light beam L32 exiting from the mixing region 15e into region 15f to have a distribution shape that additively combines the angular intensity distribution of the second light beam L32 when it enters the mixing region 15e and the symmetric reflection of this distribution with respect to the reference plane of the surface emitting light guide plate 15.

The first light beam L31 emitted from the first light source 19 is, for example, a blue-green light beam. The second light beam L32 emitted from the second light source 301 is, for example, a red light beam. The first light beam L31 enters the surface emitting light guide plate 15 from its light incidence surface 15c. The second light beam L32 enters the surface emitting light guide plate 15 from its light incidence surface 15c. The function of the mixing region 15e is to mix the first light beam L31 and the second light beam L32. The two light beams L31, L32 of different types are mixed together while they propagate in the mixing region 15e, and become a mixed light beam L33. The mixed light beam L33 is, for example, a white light beam. The mixing region 15e is disposed in the vicinity of the light incidence surface 15c.

The mixed light beam L33 is converted to illumination light L34 by the optical microelements 16. The optical microelements 16 are disposed on the back surface 15b of the surface emitting light guide plate 15. The illumination light L34 travels substantially in the +z-axis direction toward the back surface 11b of the liquid crystal panel 11. The illumination light L34 passes through the second optical sheet 13 and the first optical sheet 12 and illuminates the back surface 11b of the liquid crystal panel 11. The function of the first optical sheet 12 is to direct the illumination light L34 exiting the front surface 15a of the surface emitting light guide plate 15 toward the back surface 11b of the liquid crystal panel 11. The function of the second optical sheet 13 is to suppress optical effects such as minute illumination irregularities due to the illumination light L34.

If the two light beams L31, L32 of different types entering the surface emitting light guide plate 15 had different angular intensity distributions, the two corresponding types of planar light generated by the surface emitting light guide plate 15 would have different planar brightness distributions. The planar brightness distribution is the brightness distribution in the xy plane in FIG. 13. Accordingly, if light beam L31 is blue-green and light beam L32 is red, the planar illumination light L34 would have color irregularities in the xy plane. The illumination light L34 is planar light generated by the two light beams L31, L32.

By means of the angular intensity distribution shaping member 310, however, the surface light source device 400 in the third embodiment can give the angular intensity distribution of the second light beam L32 viewed in the xy plane substantially the same shape as the angular intensity distribution of the first light beam L31. The surface light source device 400 in the third embodiment can also give the angular intensity distribution of the second light beam L32 viewed in the zx plane substantially the same shape as the angular intensity distribution of the first light beam L31 by means of the cylindrical mirror 202 and the mixing region 15e. Therefore, in-plane color irregularities in the planar illumination light L34 can be suppressed. In particular, the surface light source device 400 in the third embodiment provides adjustment surfaces 311d, 312e in the angular intensity distribution shaping member 310. These make it possible to adjust the angular intensity distribution of the light beam L32 in the xy plane very finely to make it approximate the angular intensity distribution of the light beam L31. It is therefore more effective in suppressing color irregularities. 'Planar color irregularities' are color irregularities in positions expressed two-dimensionally in an arbitrary plane. In the third embodiment, the plane is the xy plane.

When only some of the light sources are turned on by local lighting control to make the planar illumination light L34 illuminate the xy plane locally, the angular intensity distributions of the light beams L31, L32 entering the surface emitting light guide plate 15 are approximately projected into the planar brightness distribution of the illumination light L34. More specifically, the planar brightness distribution of the illumination light L34 spreads in the xy plane from the light incidence surface 15c toward side surface 15d at angles substantially equal to the angles of the angular intensity distributions of the light beams. The light incidence surface 15c is a side of the surface emitting light guide plate 15 facing the light sources that are turned on. Side surface 15d is the side opposite to the light incidence surface 15c. Accordingly, if there is a difference in angular intensity distribution between two types of light beams L31, L32 that differ in color, then during local lighting control, the illumination light L34 will have color irregularities in the xy plane.

By means of the angular intensity distribution shaping member 310, the surface light source device 400 in the third embodiment can give the angular intensity distribution, viewed in the xy plane, of the second light beam L32 substantially the same shape as the angular intensity distribution of the first light beam L31. In the surface light source device 400 in the third embodiment, the angular intensity distribution shaping member 310 has adjustment surfaces 311d, 311e. These enable the angular intensity distribution of light beam L32 in the xy plane to be very finely adjusted to make it approximate the angular intensity distribution of light beam L31. Accordingly, planar color irregularities in the planar illumination light L34 during local lighting control can be suppressed. 'Planar color irregularities' are color irregularities in positions expressed two-dimensionally in an arbitrary plane. In the third embodiment, the plane is the xy plane.

The adjustment surfaces 311d, 312e of the angular intensity distribution shaping member 310 can also be employed when there is only a single type of light source. For example, they can be employed when the first light source 19 is excluded from the third embodiment and the second light source 301 is a white LED or laser light source.

Even in this case, the surface light source device 400 in the third embodiment is provided with adjustment surfaces 311d, 312e on the angular intensity distribution shaping member 310. Consequently, by means of the angular intensity distribution shaping member 310, the surface light source device 400 in the third embodiment can very finely adjust the angular intensity distribution of the second light beam L32, viewed in the xy plane. For that reason, planar irregularity in brightness and color in the planar illumination light L34 can be suppressed during local lighting control.

The angular intensity distribution shaping member 310 may also be disposed in the same plane as the surface emitting light guide plate 15. The angular intensity distribution shaping member 310 then, like the angular intensity distribution shaping member 110 in the first embodiment, has no light folding section 322. In that case, the surface opposite to the light incidence surface 311a becomes the light exit surface, like the light exit surface 110c of the angular intensity distribution shaping member 110. The light exit surface can be coupled to the light incidence surface 15c of the surface emitting light guide plate 15. The mixing region 15e then becomes unnecessary. The surface emitting light guide plate 15 and angular intensity distribution shaping member 310 may also be formed as a single unit.

The adjustment surfaces 311d, 312e of the angular intensity distribution shaping member 310 make it possible for the surface light source device 400 in the third embodiment to increase the amount of light exiting the angular intensity distribution shaping member 310. The reason will be given below.

Light beam L32 enters the angular intensity distribution shaping member 310 from its light incidence surface 311a, propagates inside it, and reaches the light exit surface 311c. Of the light beam L32 reaching the light exit surface 311c, light with an angle of incidence on the light exit surface 311c that satisfies the total reflection condition is totally reflected by the light exit surface 311c and returned to the light incidence surface 311a. Accordingly, it does not exit from the light exit surface 311c into the following optics. The following optics is the cylindrical mirror 202 in the surface light source device 400 in the third embodiment. The amount of light entering the surface emitting light guide plate 15 then decreases, lowering the brightness of the planar light emitted from the surface light source device 400. The total reflection condition with respect to the angle of incidence on the light beam L32 on the light exit surface 311c is the critical angle derived from the difference in refractive index between the angular intensity distribution shaping member 310 and the air layer in accordance with Snell's law.

In the surface light source device 400 in the third embodiment, the adjustment surfaces 311d, 312e of the angular intensity distribution shaping member 310 enable the angular intensity distribution of the light beam L32 to be very finely adjusted. In the light beam L32, light with an angle of incidence on the light exit surface 311c that satisfies the total reflection condition can be converted to light that does not satisfy the total reflection condition. Accordingly, the amount of light exiting the angular intensity distribution shaping member 310 can be increased. Consequently, the brightness of the illumination light L34 can be improved with respect to the amount of light emitted from the second light source 301, and the power consumption of the surface light source device 400 can be reduced.

The adjustment surfaces 311d, 312e in the third embodiment have a shape that is convex toward the interior of the angular intensity distribution shaping member 310. The adjustment surfaces 311d, 312e may have a flat shape or a shape that is convex toward the exterior of the angular intensity distribution shaping member 310. The angular intensity distribution of the second light beam L32 can be adjusted by reflection of part of the second light beam L32 from the adjustment surfaces 311d, 311e. If the adjustment surfaces 311d, 312e have a flat shape or a shape convex toward the exterior of the angular intensity distribution shaping member 310, however, it becomes difficult to meet the total reflection condition when the second light beam L32 is reflected by the adjustment surfaces 311d, 311e. If the adjustment surfaces 311d, 312e have a flat shape, very fine control of the angular intensity distribution of the second light beam L32 becomes difficult.

The adjustment surfaces 311d, 312e in the third embodiment have curved surfaces. The adjustment surfaces 311d, 312e may, however, have a shape formed by linking flat surfaces together. This is because the angular intensity distribution of the second light beam L32 can be adjusted by reflection of part of the second light beam L32 by the adjustment surfaces 311d, 311e. The angular intensity distribution can be adjusted more finely, however, by curved adjustment surfaces 311d, 311e.

The light reflecting sheet 17 is disposed facing the back surface 15b of the surface emitting light guide plate 15. Of the light in the mixed light beam L33, light exiting the back surface 15b of the surface emitting light guide plate 15 is reflected by the light reflecting sheet 17 and travels toward the back surface 15b of the surface emitting light guide plate 15. That light then passes through the surface emitting light guide plate 15 and exits from its front surface 15a toward the back surface 11b of the liquid crystal panel 11 as illumination light L34. Of the light rays in the mixed light beam L33, the light rays encountering the optical microelements 16 also exit as illumination light L34.

Although the inclined surface 311b of the angular intensity distribution shaping member 310 is inclined by an angle of about 45 degrees with respect to the xy plane in the description given above, the present invention is not limited to this angle. The angle of incidence of the second light beam L32 on the inclined surface 311b is set by the total reflection condition. The total reflection condition is obtained from the critical angle θt and the half angle of the angular intensity distribution of the second light beam L32.

To optimize the light path of the second light beam L32, the angle of inclination of the inclined surface 311b may be changed in accordance with the positional relationships among components such as the light exit surface 311c, cylindrical mirror 202, surface emitting light guide plate 15, and inclined surface 311b. Alternatively, the location and shape of the cylindrical mirror 202 may be changed to optimize the light path of the second light beam L32, instead of changing the inclination angle of the inclined surface 311b.

The adjustment of the angle of inclination of the inclined surface 311b or the location of the cylindrical mirror 202 is carried out for the following three purposes. The first purpose is to couple the second light beam L32 efficiently into the cylindrical mirror 202 and surface emitting light guide plate 15. The second purpose is to tilt the beam axis that the second light beam L32 has just after entering the surface emitting light guide plate 15 so that it is at an arbitrary angle to the reference plane of the surface emitting light guide plate 15, as viewed in the zx plane. The third purpose is to provide the second light beam L32, just after it enters the surface emitting light guide plate 15, with an arbitrary angular intensity distribution, as viewed in the zx plane.

The positional and other relationships between the second light source 301 and cylindrical mirror 202 are set according to the angular intensity distribution of the second light beam L32, the size (diameter) of the light flux of the second light beam L32, the curvature of the cylindrical mirror 202, the thickness of the surface emitting light guide plate 15, and so on. The positional and other relationships between the cylindrical mirror 202 and surface emitting light guide plate 15 are set according to the angular intensity distribution of the second light beam L32, the size (diameter) of the light flux of the second light beam L32, the curvature of the cylindrical mirror 202, the thickness of the surface emitting light guide plate 15, and so on. Accordingly, the positional and other relationships among the members must be optimized when a condition changes. 'Positional and other relationships' means the relationships among components which determine the light path of the light beam, such as the locations of the components and the inclinations of their reflecting surfaces.

In FIG. 13, the angular intensity distribution shaping member 310 is disposed parallel to the surface emitting light guide plate 15. The second light beam L32 exits the second light source 301 in a direction parallel to the surface emitting light guide plate 15. The present invention, however, is not limited to this configuration.

For example, the light incidence surface 311a of the angular intensity distribution shaping member 310 may be positioned at a distance from the light reflecting sheet 17. That is, the angular intensity distribution shaping member 310 may be tilted away from the xy plane. The exit surface 311c of the angular intensity distribution shaping member 310 can then be disposed in the vicinity of the cylindrical mirror 202 even if the second light source 301 and its peripheral members are large. This makes it possible to mitigate the light loss that may occur in the interval until the second light beam L32 that has left the exit surface 311c reaches the cylindrical mirror 202. The peripheral members of the second light source 301 are, for example, its fixture members and the like.

If the angular intensity distribution shaping member 310 is tilted at an angle with respect to the surface emitting light guide plate 15, the second light source 301 is positioned in such a way that the beam axis of the second light beam L32 parallels the light exit surface 311c and surface 311f. This makes it easy to control the light reflection angle in the light folding section 322 of the angular intensity distribution shaping member 310. It will be appreciated that the second light source 301 is disposed facing the light incidence surface 311a of the angular intensity distribution shaping member 310.

The angle of inclination of the inclined surface 311b is determined by consideration of the following three requirements. The first requirement is the direction of the beam axis of the second light beam L32 exiting the light folding section 322 of the angular intensity distribution shaping member 310, with respect to the direction of the beam axis of the second light beam L32 entering the light folding section 322. The second requirement is the direction of the beam axis of the second light beam L32 exiting the cylindrical mirror 202, with respect to the direction of the beam axis of the second light beam L32 entering the cylindrical mirror 202. The third requirement is that the second light beam L32 incident on the inclined surface 311b must satisfy the condition for total reflection at the inclined surface 311b. By specifying an angle between the beam axis of the second light beam L32 and the inclined surface 311b that satisfies these three requirements, light loss at the inclined surface 311b can be suppressed.

Making the angular intensity distribution shaping member 310 in the second embodiment thinner can lead to a reduction in the size of the cylindrical mirror 202. The reason is that the thickness of the line of light exiting the inclined surface 311b is reduced. Making the angular intensity distribution shaping member 310 thinner can also lead to a reduction in the thickness of the surface emitting light guide plate 15. The reason is that the dimension of the cylindrical mirror 202 in the z-axis direction is reduced. Accordingly, use of a thin angular intensity distribution shaping member 310 is preferred. However, since the reduced thickness decreases the rigidity of the angular intensity distribution shaping member 310, the thickness reduction is preferably kept within a range such that the rigidity of the angular intensity distribution shaping member 310 does not become too low.

While the second light beam L32 that exits the angular intensity distribution shaping member 310 is travelling in the angular intensity distribution shaping member 310, it becomes a line of light having a light flux diameter equal to the thickness of the angular intensity distribution shaping member 210 in the zx plane.

The second light beam L32 travels in the angular intensity distribution shaping member 310 in the −x-axis direction by reflection between two surfaces, the light exit surface 311c and surface 311f. Surface 311f faces the light exit surface 311c. The light exit surface 311c is parallel to surface 311f. The beam axis of the second light beam L32 is parallel to these two surfaces, the light exit surface 311c and surface 311f.

The second light beam L32 exiting the light exit surface 311c is a light beam having substantially the same angular intensity distribution as the angular intensity distribution it had just after exiting the second light source 301. The second light beam L32 exiting the light exit surface 311c can be regarded as a secondary light source that exits the angular intensity distribution shaping member 310.

The cross section of the reflecting surface 202a of the cylindrical mirror 202 in the zx plane has a concave circular arc shape. This being the case, the angles between tangents to the circular arc shape of the reflecting surface 202a and the rays constituting the light flux of the second light beam L32 take a range of values. That is, the reflecting surface 202a has the effect of spreading the parallel light. Accordingly, the surface light source device 400 in the third embodiment can widen the full angle of the angular intensity distribution of the second light beam L32 by means of the cylindrical mirror 202.

In the descriptions of the embodiments, terms such as 'parallel' and 'perpendicular' have been used to indicate positional relationships among components and shapes of components. Expression involving terms such as 'approximately' and 'substantially' have also been used, as in approximately square, approximately 90 degrees, substantially parallel, and so on. Those expressions indicate inclusion of ranges that take account of manufacturing tolerances, assembly variability, and the like. For example, 'substantially in the −z-axis direction' is an expression that includes manufacturing tolerances, assembly variability, and the like. The claims include ranges that take account of manufacturing tolerances, assembly variability, and the like even when terms such as 'substantially' are not recited. If 'substantially' is recited in a claim, it also indicates inclusion of a range that takes account of manufacturing tolerances, assembly variability, and the like.

REFERENCE CHARACTERS liquid crystal display device; 11 liquid crystal panel; 11a display surface; 11b back surface; 12 first optical sheet; 13 second optical sheet; 15 surface emitting light guide plate; 15a front surface; 15b back surface; 15c light incidence surface; 15d side surface; 15e mixing region; 15f region; 16 optical microelement; light reflecting sheet; 18, 19 first light source; 21 control unit; 22 liquid crystal panel driving unit; 23 light source driving unit; 25 video signal; 26 liquid crystal panel control signal; 27 light source control signal; 100, 200, 300, 400 surface light source device; 101, 201, 301 second light source; 101a, 101b, 101c, 101d, 101e, 101f, 201a, 201b, 201c, 201d, 201e, 201f, 301a, 301b, 301c, 301d, 301e, 301f laser emission element; 102, 202 cylindrical mirror; 102a, 202a reflecting surface; 110, 210, 310, 210a, 210b, 210c, 310a, 310b, 310c angular intensity distribution shaping member; 110a, 211a, 311a, 110aa, 110ab, 110ac, 110ad, 110ae, 110af, 211aa, 211ab, 211ac, 211ad, 211ae, 211af, 311aa, 311ab, 311ac light incidence surface; 211b, 311b inclined surface; 110c, 211c, 311c light exit surface; 211d, 211e, 311d, 311e adjustment surface; 211f, 311f surface; 111, 333 optical microstructure; 221 plate section; 222, 322 light folding section; L11, L21, L31 first light beam; L12, L22, L32, L12a, L12b, L12c, L12d, L12e, L12f, L22a, L22b, L22c, L22d, L22e, L22f, L32a, L32b, L32c, L32d, L32e, L32f second light beam; L13, L23, L33 mixed light beam; L14, L24, L34 illumination light; 180, 120, 121a, 121b, 122 angular intensity distribution.

What is claimed is:

1. An angular intensity distribution shaping member comprising:
    a first surface for receiving a light beam emitted from a light source, the first surface having a length in a width direction that is longer than a length in a thickness direction perpendicular to the width direction;
    second surfaces forming a plate-shaped light path on which the light beam incident from the first surface propagates by total reflection, the second surfaces including at least one adjustment surface for spreading a full angle of an angular intensity distribution, in the width direction, of the light beam incident from the first surface so that the full angle becomes wider than the full angle of the angular intensity distribution, in the width direction, of the light beam just after emission from the light source; and
    a third surface through which the light beam exits, the full angle of its angular intensity distribution in the width direction having been widened by the at least one adjustment surface,
    wherein the at least one adjustment surface has a circular arc shape in a plane perpendicular to the thickness direction and projects toward a center of the light path; and
    wherein the first surface directly connects with the at least one adjustment surface.

2. The angular intensity distribution shaping member of claim 1, wherein:
    the at least one adjustment surface is a plurality of adjustment surfaces facing each other across the light path;
    the first surface is a single plane;
    the light beam emitted from the light source includes a mutually parallel plurality of light beams; and
    the plurality of light beams are incident on the first surface.

3. A surface light source device comprising:
    at least one angular intensity distribution shaping member as recited in claim 2;
    a light source for emitting the light beam incident on the first surface of the angular intensity distribution shaping member;
    another light source for emitting another light beam having a wider angular intensity distribution than said light beam just after emission from said light source; and
    a surface emitting light guide plate having a front surface, a back surface, and a side surface disposed between and linking the front surface and the back surface, the light beam emitted from the third surface of the angular intensity distribution shaping member and the another light beam emitted from the another light source being incident on the side surface, for emitting said light beam and the another light beam as planar light from the front surface.

4. The surface light source device of claim 3, wherein the angular intensity distribution of the light beam emitted from the third surface of the angular intensity distribution shaping member just before incidence on the surface emitting light guide plate is equal to the angular intensity distribution of the another light beam emitted from the another light source.

5. The surface light source device of claim 3, wherein:
    the at least one angular intensity distribution shaping member includes a plurality of angular intensity distribution shaping members arrayed in the width direction; and
    said light source includes a plurality of laser emission elements arrayed in the width direction.

6. The angular intensity distribution shaping member of claim 1, wherein:
    the first surface includes a plurality of light incidence surfaces;
    a mutually adjacent pair of light incidence surfaces in the plurality of light incidence surfaces face in mutually differing directions;
    the light beam emitted from the light source includes a plurality of light beams;
    a mutually adjacent pair of light beams in the plurality of light beams travel in mutually differing directions; and
    the plurality of light beams are incident on respective ones of the plurality of light incidence surfaces.

7. A surface light source device comprising:
    at least one angular intensity distribution shaping member as recited in claim 6;
    a light source for emitting the light beam incident on the first surface of the angular intensity distribution shaping member;
    another light source for emitting another light beam having a wider angular intensity distribution than said light beam just after emission from said light source; and
    a surface emitting light guide plate having a front surface, a back surface, and a side surface disposed between and linking the front surface and the back surface, the light beam emitted from the third surface of the angular intensity distribution shaping member and the another light beam emitted from the another light source being incident on the side surface, for emitting said light beam and the another light beam as planar light from the front surface.

8. The surface light source device of claim 7, wherein the angular intensity distribution of the light beam emitted from the third surface of the angular intensity distribution shaping member just before incidence on the surface emitting light guide plate is equal to the angular intensity distribution of the another light beam emitted from the another light sources.

9. The surface light source device of claim 7, wherein:
    the at least one angular intensity distribution shaping member includes a plurality of angular intensity distribution shaping members arrayed in the width direction; and
    said light source includes a plurality of laser emission elements arrayed in the width direction.

10. A surface light source device comprising:
    at least one angular intensity distribution shaping member as recited in claim 1;
    a light source for emitting the light beam incident on the first surface of the angular intensity distribution shaping member;
    another light sources for emitting another light beam having a wider angular intensity distribution than said light beam just after emission from said light source; and
    a surface emitting light guide plate having a front surface, a back surface, and a side surface disposed between and linking the front surface and the back surface, the light beam emitted from the third surface of the angular intensity distribution shaping member and the another light beam emitted from the another light source being incident on the side surface, for emitting said light beam and the another light beam as planar light from the front surface.

11. The surface light source device of claim 10, wherein the angular intensity distribution of the light beam emitted from the third surface of the angular intensity distribution shaping member just before incidence on the surface emitting light guide plate is equal to the angular intensity distribution of the another light beam emitted from the another light source.

12. The surface light source device of claim 10, wherein:
the at least one angular intensity distribution shaping member includes a plurality of angular intensity distribution shaping members arrayed in the width direction; and
said light source includes a plurality of laser emission elements arrayed in the width direction.

13. An angular intensity distribution shaping member comprising:
a first surface for receiving a light beam emitted from a light source, the first surface having a length in a width direction that is longer than a length in a thickness direction perpendicular to the width direction;
second surfaces forming a plate-shaped light path on which the light beam incident from the first surface propagates by total reflection, the second surfaces including at least one adjustment surface for spreading a full angle of an angular intensity distribution, in the width direction, of the light beam incident from the first surface so that the full angle becomes wider than the full angle of the angular intensity distribution, in the width direction, of the light beam just after emission from the light sources; and
a third surface through which the light beam exists, the full angle of its angular intensity distribution in the width direction having been widened by the at least one adjustment surface, wherein:
the at least one adjustment surface is a plurality of adjustment surfaces facing each other across the light path;
the first surface is a single plane;
the light beam emitted from the light source includes a mutually parallel plurality of light beams; and
the plurality of light beams are incident on the first surface.

14. A surface light source device comprising:
at least one angular intensity distribution shaping member as recited in claim 13;
a light source for emitting the light beam incident on the first surface of the angular intensity distribution shaping member;
another light source for emitting another light beam having a wider angular intensity distribution than said light beam just after emission from said light source; and
a surface emitting light guide plate having a front surface, a back surface, and a side surface disposed between and linking the front surface and the back surface, the light beam emitted from the third surface of the angular intensity distribution shaping member and the another light beam emitted from the another light source being incident on the side surface, for emitting said light beam and the another light beam as planar light from the front surface.

15. The surface light source device of claim 14, wherein the angular intensity distribution of the light beam emitted from the third surface of the angular intensity distribution shaping member just before incidence on the surface emitting light guide plate is equal to the angular intensity distribution of the another light beam emitted from the another light source.

16. The surface light source device of claim 14, wherein:
the at least one angular intensity distribution shaping member includes a plurality of angular intensity distribution shaping members arrayed in the width direction; and
said light source includes a plurality of laser emission elements arrayed in the width direction.

* * * * *